US007000181B2

(12) United States Patent
Press

(10) Patent No.: US 7,000,181 B2
(45) Date of Patent: Feb. 14, 2006

(54) DYNAMIC DATA DISPLAY HAVING SLIDE DRAWER WINDOWING

(75) Inventor: Robert Press, New York, NY (US)

(73) Assignee: International Business Machines Corporation, Armonk, NY (US)

(*) Notice: Subject to any disclaimer, the term of this patent is extended or adjusted under 35 U.S.C. 154(b) by 820 days.

(21) Appl. No.: 09/886,199

(22) Filed: Jun. 21, 2001

(65) Prior Publication Data
US 2002/0198906 A1  Dec. 26, 2002

(51) Int. Cl.
G06F 15/00 (2006.01)
(52) U.S. Cl. ................................ 715/503; 715/777
(58) Field of Classification Search ................ 715/503, 715/504, 500, 776, 777, 764; 345/790, 840
See application file for complete search history.

(56) References Cited

U.S. PATENT DOCUMENTS

| 5,255,363 | A |   | 10/1993 | Seyler |
| 5,392,387 | A | * | 2/1995 | Fitzpatrick et al. ......... 715/776 |
| 5,542,040 | A | * | 7/1996 | Chang et al. ................ 715/776 |
| 5,623,282 | A |   | 4/1997 | Graham et al. |
| 5,623,591 | A |   | 4/1997 | Cseri |
| 5,634,095 | A | * | 5/1997 | Wang et al. ................. 715/763 |
| 5,784,545 | A |   | 7/1998 | Anderson et al. |
| 5,819,263 | A | * | 10/1998 | Bromley et al. ................ 707/3 |
| 5,870,092 | A | * | 2/1999 | Bedford-Roberts ......... 715/776 |
| 5,894,311 | A | * | 4/1999 | Jackson ....................... 345/440 |
| 6,037,941 | A | * | 3/2000 | Goto ........................... 715/777 |
| 6,134,535 | A | * | 10/2000 | Belzberg ...................... 705/37 |
| 6,157,934 | A | * | 12/2000 | Khan et al. .................. 715/503 |
| 6,225,996 | B1 | * | 5/2001 | Gibb et al. .................. 715/784 |
| 6,246,407 | B1 | * | 6/2001 | Wilks et al. ................. 715/803 |
| 6,266,814 | B1 | * | 7/2001 | Lemmons et al. ............. 725/44 |
| 6,445,400 | B1 | * | 9/2002 | Maddalozzo et al. ........ 715/803 |
| 6,557,164 | B1 | * | 4/2003 | Faustini ....................... 717/107 |
| 6,613,098 | B1 | * | 9/2003 | Sorge et al. ................. 715/503 |
| 6,701,485 | B1 | * | 3/2004 | Igra et al. .................... 715/503 |
| 6,850,255 | B1 | * | 2/2005 | Muschetto ................... 715/788 |
| 2002/0010743 | A1 | * | 1/2002 | Ryan et al. .................. 709/205 |
| 2002/0015609 | A1 | * | 2/2002 | Webber ....................... 400/489 |
| 2002/0032611 | A1 | * | 3/2002 | Khan ........................... 705/26 |
| 2002/0070972 | A1 | * | 6/2002 | Windl et al. ................. 345/777 |
| 2002/0085040 | A1 | * | 7/2002 | Krolczyk et al. ............ 345/777 |

OTHER PUBLICATIONS

Polilli, Conferencing Software Available for Windows, Info-World, Feb. 7, 1994, vol. 16, iss. 6, p. 44, 1 pgs, from ProQuest as pp. 1-2.*

(Continued)

Primary Examiner—Cong-Lac Huynh
(74) Attorney, Agent, or Firm—Schmeiser, Olsen & Watts; John R. Pivnichny

(57) ABSTRACT

A dynamic data display system and associated method of usage. A portion of a data feed is dynamically displayed, such as in spreadsheet format, on a main drawer $D_0$ that overlays a display screen. N additional drawers $D_1$, $D_2$, ..., $D_N$ are positioned such that $D_1$ conditionally overlays $D_0$, $D_2$ conditionally overlays $D_1$, ..., $D_N$ conditionally overlays $D_{N-1}$. N is at least 2. Each drawer $D_i$ (i=1, 2, ..., N) is adapted to being opened or to being closed. A user command is directed to a first drawer of the N additional drawers, which causes content on a second drawer of the N additional drawers to be displayed in accordance with the user command.

56 Claims, 16 Drawing Sheets

OTHER PUBLICATIONS

Business Editors & High Tech Writers, Belzberg Technologies Inc. Awarded U.S. Patent for Spreadsheet Trading Technology, Business Wire, Oct. 20, 2000, p. 1.*

Brett, New Electronic Spreadsheet Has Been Getting Good Reviews, Toronto Star, Oct. 11, 1987, p. F.7.*

Business Editors, Standard & Poor's Selects Partes' EDGAR Data Service to Provide Real-Time Fillings for Standard & Poor's Market Insight, Business Wire, Jun. 9, 1999, p. 1.*

Jim Boyce et al., Using Microsoft Office 97, Que Corporation 1997, pp. 252-256.*

Microsoft Corporation, copyright 1999, Microsoft Excel, screenshots, pp. 1-6.*

Microsoft Corporation, copyright 1999, Microsoft Excel, referred as Excel, screenshot, p. 9.*

* cited by examiner

DYNAMIC DATA DISPLAY HAVING SLIDE DRAWER WINDOWING

BACKGROUND OF THE INVENTION

1. Technical Field

The present invention relates to a data display structure, and associated method of usage, for dynamically displaying a data feed.

2. Related Art

A spreadsheet in a traditional spreadsheet format is not well suited to dynamically displaying a data feed. Thus there is a need for a data display structure, and associated method of usage, that is well suited to dynamically displaying a data feed.

SUMMARY OF THE INVENTION

The present invention provides a data display structure, comprising:

a main drawer $D_0$ that overlays a display screen, wherein $D_0$ is adapted to dynamically display a portion of a data feed; and N additional drawers $D_1, D_2, \ldots, D_N$ in an overlay pattern $\{D_1, D_2, \ldots, D_N\}$ relative to $D_0$, wherein N is at least 2, wherein each drawer $D_i$ (i=1, 2, ..., N) is adapted to being opened or to being closed, and wherein a first drawer of $D_0$, $D_1, \ldots, D_N$ is adapted to display content in accordance with a user command that is directed to a second drawer of $D_0$, $D_1, \ldots, D_N$.

The present invention provides a method of dynamically displaying data, comprising:

overlaying a main drawer $D_0$ on a display screen;

dynamically displaying, in spreadsheet format on $D_0$, a portion of a data feed; and positioning N additional drawers $D_1, D_2, \ldots, D_N$ in an overlay pattern $\{D_1, D_2, \ldots, D_N\}$ relative to $D_0$, wherein N is at least 2, wherein each drawer $D_i$ (i=1, 2, ..., N) is adapted to being opened or to being closed;

executing a user command that is directed to a first drawer of $D_0, D_1, \ldots, D_N$; and displaying content on a second drawer of $D_0, D_1, \ldots, D_N$ based on the user command.

The present invention provides a data display structure, and associated method of usage, that is well suited to dynamically displaying a data feed.

BRIEF DESCRIPTION OF THE DRAWINGS

The file of this patent contains at least one drawing executed in color. Copies of this patent with color drawing(s) will be provided by the Patent and Trademark Office upon request and payment of the necessary fees.

Each of FIGS. 1–21 herein is in accordance with embodiments of the present invention.

FIGS. 7–17 depict data display structures in conjunction with a live data feed of stock bids and offers occurring in real time on the New York Stock Exchange, with the FIGS. 7–17 having variations in:

whether the data feed is being displayed or not displayed;

whether if the data feed is being displayed, the entire data feed or a portfolio subset of the data field is being displayed;

whether drawers of the data display structure are open or closed;

which of several keys is being used as a sort key for sorting rows of a spreadsheet representation in a drawer of the data display structure;

whether rows of the spreadsheet representation are being highlighted or not highlighted; and whether buttons of a drawer of the data display structure are being highlighted or not highlighted.

Figure 1:
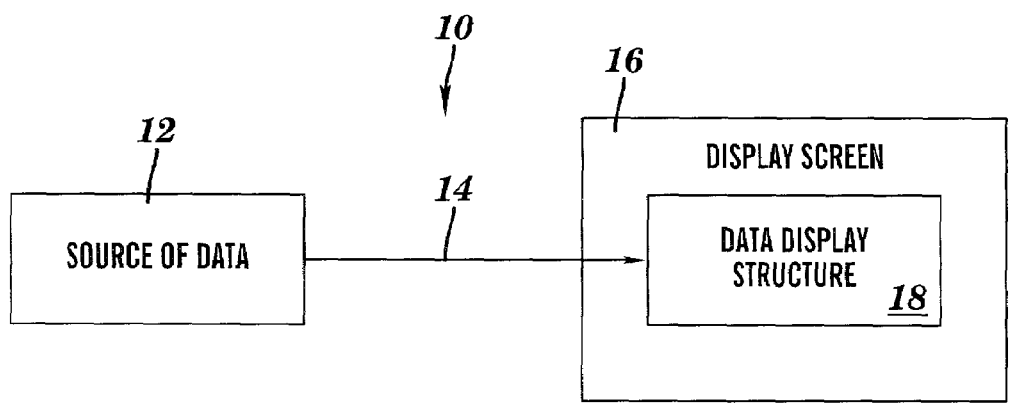
FIG. 1 depicts a data display system comprising a data display structure having a main drawer and three movable drawers.

FIGS. 18–21 depict a more detailed view of the data display structure of FIG. 1 with a main drawer and movable drawers, showing a different arrangement of the main drawer and the movable drawers in each of FIGS. 18–21.

DETAILED DESCRIPTION OF THE INVENTION

Each of FIGS. 1–21 herein is in accordance with embodiments of the present invention.

FIG. 1 depicts a data display system 10, comprising a source 12 of data that transmits a data feed 14 to a data display structure 18 that overlays a display screen 16. The display screen 16 may include, inter alia, a computer screen, a computer terminal screen, a television screen etc. The data feed 14 may be a live data feed or a stored data feed. A live data feed is a data feed of events that are occurring at the source 12 in real time (e.g., stock bids and offers that occur in real time) and are being fed to the data display structure 18 in real time. If the data feed 14 is a live data feed that comprises stock bids and offers occurring in real time on a stock exchange, then the source 12 may be, inter alia, the New York Stock Exchange. A stored data feed is a data feed of events that previously occurred and is stored at the source 12 on a storage medium such as a video tape (i.e., a "video data feed") or a compact disk. If the data feed 14 is a stored data feed of a recorded movie, then the source 12 may be, inter alia, a video tape that includes the recorded movie.

Figure 2:
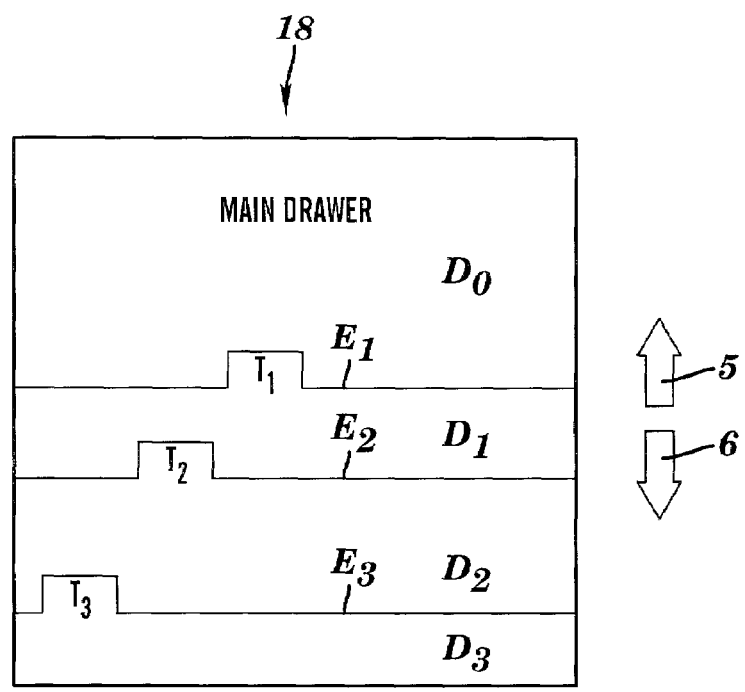
FIG. 2 depicts a more detailed view of the data display structure of FIG. 1.

FIG. 2 depicts the data display structure 18 of FIG. 1 in greater detail. In FIG. 2, the data display structure 18 comprises: a main drawer denoted as $D_0$; and N additional drawers generally denoted as $D_1, D_2, , D_N$, wherein $N \geq 1$. Note that N=3 in FIG. 2. The main drawer $D_0$ overlays the display screen 16 (see FIG. 1), which means that the main drawer $D_0$ is over (i.e., above or on top of) a portion of the display screen 16. The drawers $D_1, D_2, \ldots, D_N$ are in an overlay pattern $\{D_1, D_2, \ldots, D_N\}$ relative to $D_0$, which means that $D_1$ conditionally overlays $D_0$, $D_2$ conditionally overlays $D_1, \ldots,$ and $D_N$ conditionally overlays $D_{N-1}$. Generally, each drawer $D_i$ conditionally overlays $D_{i-1}$, for i=1, 2, ..., N, which means that $D_i$ is over (i.e., above or on top of), $D_{i-1}$, whenever $D_i$ and $D_{i-1}$, each overlay a same portion of the display screen 16. Note that the scope of the present invention includes configurations in which $D_i$ and $D_{i-1}$, (i=1, 2, ..., N) do not overlay the same portion of the display screen 16, as is illustrated in FIGS. 18–21. In FIGS. 18–21, the data display structure 18 of FIG. 1 is depicted in a more detailed view that shows the main drawer $D_0$ and movable drawers $D_1, D_2, D_3, D_4$ in a different arrangements in each of FIGS. 18–21. As illustrated in FIGS. 18–21, the present invention does not limit placement, size, location, or direction of movement of any drawer in the data display structure 18 of FIG. 1.

In FIG. 2, each drawer $D_i$ has an associated tab $T_i$ as illustrated. Generally, the tab $T_i$ may be placed at any surface portion of the drawer $D_i$ (i=1, 2, . . . , N). The drawers $D_0$, $D_1, D_2, \ldots, D_N$ are intended to dynamically display the data feed 14 of FIG. 1 or a portion thereof.

In FIG. 2, each drawer $D_i$ has a "viewable area" $A_i$ (i=0, 1, 2, . . . , N), wherein $A_i \geq 0$. The "viewable area" $A_i$ is an area of the drawer $D_i$ that is visible (e.g., not hidden) to a person (i.e., "user" or "viewer") who is viewing the data display structure 18. If no area of the drawer $D_i$ is visible to the user, then $A_i=0$. The viewable area $A_i$ may change dynamically as the drawer $D_i$ is "being open" or "being closed". The drawer $D_i$ (i=1, 2, . . . , N) is being opened or is being closed if $D_i$ is being moved (e.g., by dragging the tab $T_i$) in a direction 5 or 6, respectively. Note that an absence of tabs does not limit the capability of opening or closing the drawers in the data display structure 18. For example, the drawer $D_i$ (i=1, 2, . . . , N) may be further opened or further closed by dragging a bordering edge $E_i$ of the drawer $D_i$ instead of by dragging the tab $T_i$. If $D_i$ is being moved in the direction 5, then $D_i$ is being moved in a direction that covers $D_0$ to a greater extent. If $D_i$ is being moved in the direction 6, then $D_i$ is being moved in a direction that covers $D_0$ to a lesser extent. Definitionally, $D_i$ (i=1, 2, . . . , N) is adapted to being opened if $D_i$ is capable of being opened (i.e., capable of being moved in the direction 5), and $D_i$ is adapted to being closed if $D_i$ is capable of being closed (i.e., capable of being moved in the direction 6). An action of "closing" $D_i$ subjects $D_i$ to being opened; i.e., moved in the direction 5. An action of "closing" $D_i$ subjects $D_i$ to being closed; i.e., being moved in the direction 6.

If $D_i$ is being opened and no other drawer is being moved (i.e., being opened or being closed), then $A_i$ increases and $A_{i-1}$ decreases such that the sum of $A_i$ and $A_{i-1}$ remains approximately constant. If $D_i$ is being closed and no other drawer is being moved, then $A_i$ decreases and $A_{i-1}$ increases such that the sum of $A_i$ and $A_{i-1}$ remains approximately constant Accordingly, if no other drawer is being moved, then opening or closing drawer $D_i$ so as to change the viewable area in drawer $D_i$ by an amount of $\Delta A$ results in the viewable area in drawer $D_{i-1}$ changing by an amount of approximately $-\Delta A$, wherein $\Delta A > 0$ if $D_i$ is being opened and $\Delta A < 0$ if $D_i$ is being closed.

The drawer $D_i$ (i=0, 1, 2, . . . , N) is "open" if $D_i$ cannot be moved in the direction 6. If $D_i$ is "open", then $D_i$ is "partially open" if $D_i$ can be moved in the direction 5 and is "fully open" if $D_i$ cannot be moved in the direction 5. The drawer $D_i$ is "closed" if $D_i$ is not open. Thus, $D_i$ is always in one of the following states: partially open, fully open, or closed. Note that in FIG. 2, $A_0=0$ if $D_1$ is fully open, and that $A_0=A_{0MAX}$ if $D_1$ is closed, wherein $A_{0MAX}$ is the maximum possible value of $A_0$. Also note that in FIG. 2, $(A_1+A_2+ \ldots +A_N)$ is approximately equal to $A_{0MAX}$.

Figure 3:
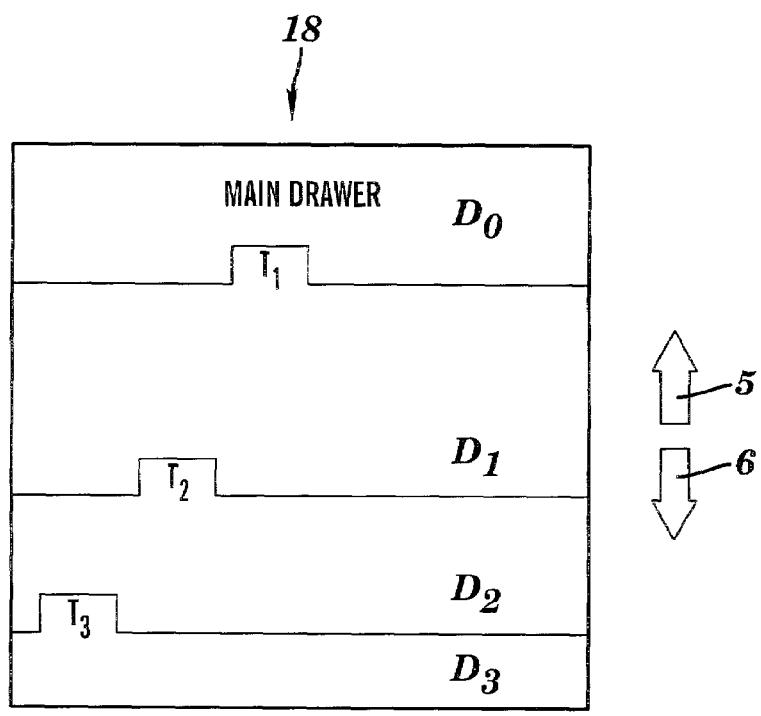
FIG. 3 depicts FIG. 2 after a first movable drawer has been moved in a door-opening direction.

FIG. 3 depicts FIG. 2 after the drawer $D_1$ has been moved in the direction 5 and is said to have been moved in a "door-opening" direction.

Figure 4:
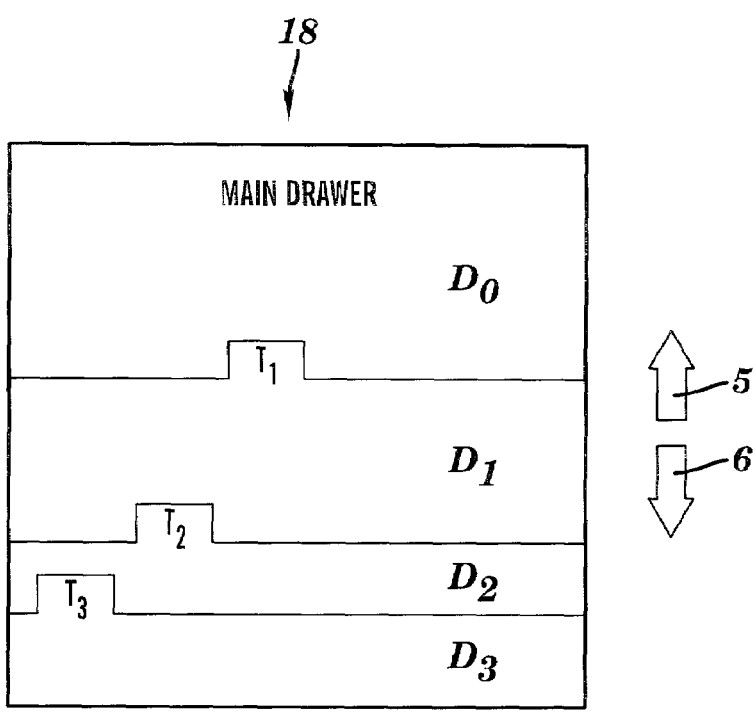
FIG. 4 depicts FIG. 2 after a second movable drawer has been moved in a door-closing direction.

FIG. 4 depicts FIG. 2 after the drawer $D_2$ has been moved in the direction 6 and is said to have been moved in a "door-closing" direction.

Figure 5:
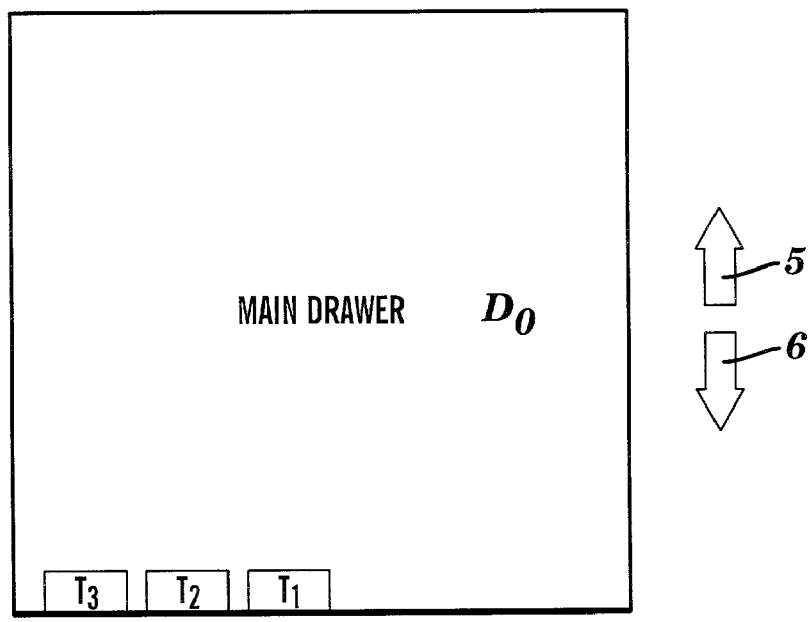
FIG. 5 depicts the three movable drawers of FIG. 2 as each being closed.

FIG. 5 depicts the drawers $D_1, D_2$, and D3 of FIG. 2 such that in FIG. 3 the drawers $D_1, D_2$, and D3 are each closed.

Figure 6:
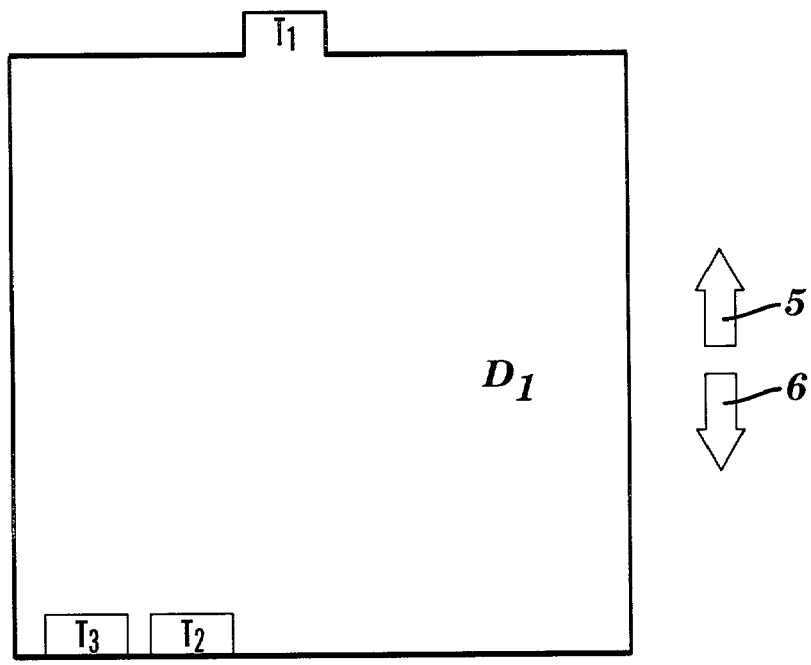
FIG. 6 depicts the three movable drawers of FIG. 2 with one of the three movable drawers fully opened, and the remaining two drawers of the three movable drawers closed.

FIG. 6 depicts the drawers $D_1, D_2$, and D3 of FIG. 2 such that in FIG. 3: the drawer $D_1$ is fully opened, the drawer $D_2$ is closed, and the drawer $D_3$ is closed.

FIGS. 7–17 depict data display structures in conjunction with a live data feed of stock bids and offers occurring in real time on the New York Stock Exchange (NYSE). The data display structure shown in each of FIGS. 7–17 is called a "NYSE data display structure".

Figure 7:
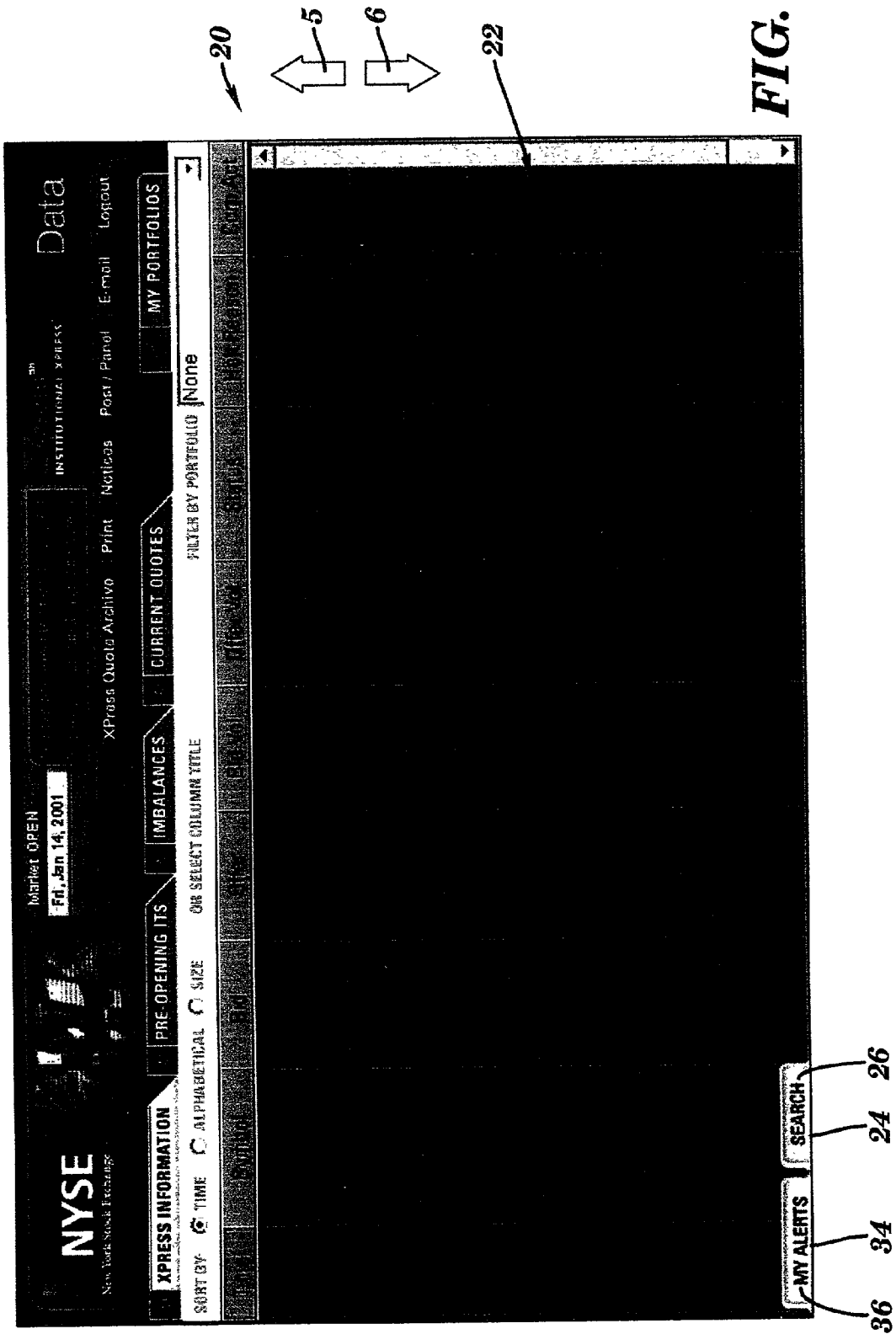

FIG. 7 depicts a NYSE data display structure 20 in an initial condition prior to displaying the data feed 14 of FIG. 1. The NYSE data display structure 20 includes a main drawer 22, an additional drawer 24 having a tab 26 with a "SEARCH" label, and an additional drawer 34 having a tab 36 with a "MY ALERTS" label. The main drawer 22 was more generally represented supra in FIGS. 2–5 as $D_0$. The additional drawer 24 and associated tab 26 was more generally represented supra in FIGS. 2–5 as $D_1$ and $T_1$, respectively. The additional drawer 34 and associated tab 36 was more generally represented supra in FIGS. 2–5 as $D_2$ and $T_2$, respectively. The drawer 24 is an example of a "Search" drawer type, and the drawer 34 is an example of an "Alerts" drawer type. The features that characterize "Search" drawer and "Alerts" drawer types will be presented infra.

Figure 8:
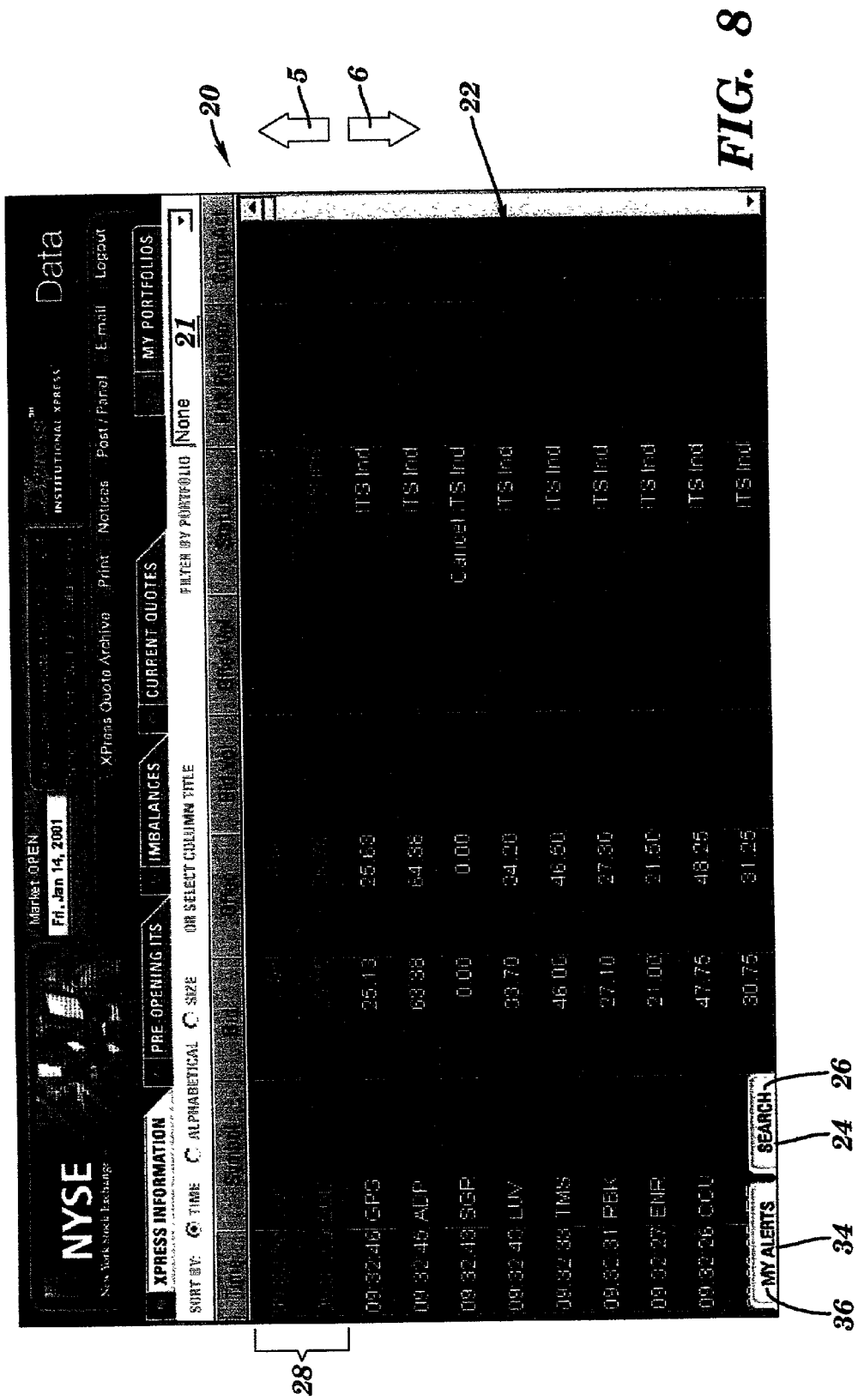

FIG. 8 depicts FIG. 7 such that the main drawer 22 displays the "entire" (i.e., all of the) data feed 14 of FIG. 1. The drawers 24 and 34 are closed. The "entire" data feed 14 of FIG. 1 is denoted by the word "None" in the window 21 below the "MY PORTFOLIOS" window in an upper right portion of FIG. 8. A portion of the data feed 14 that is less than the entire data feed 14 is displayed on the main drawer 22 when text other than "None" appears in the window 21, as will be described infra.

Displaying a data feed (or a portion thereof) by a given drawer means displaying the data of the data feed (or of the portion thereof) in such a manner that such data would be visible to a viewer if not covered by a another drawer and if not limited by the viewable area of the given drawer. In contrast, a subset of the data feed may be excluded from being displayed. For example, a "portfolio subset" (to be described infra) of the data feed defines a subset of the data feed that is to be displayed and excludes from being displayed the remaining portion of the data feed.

The main drawer 22 is arranged in a "spreadsheet format" with a spreadsheet having 9 columns having headings of "Time", "Symbol", "Bid", "Offer", "Bid. Vol.", "Offer Vol.", "Status", "Halt Reason", and "Corp Act". Definitionally, the "spreadsheet format" is a tabular format of columns and rows, wherein the ordering of the rows and columns, and contents thereof, may be dictated or influenced by action of a user or viewer of the NYSE data display structure. Each row of the spreadsheet describes an event that a occurred at the time that is listed in the "Time" column of the main drawer 22. The time associated with an event is called a "timestamp" of the event Thus the portion of the data feed that is displayed in each row has a unique time stamp and an associated event, wherein the parameters of the event are described by the data entries in said each row.

The "Symbol" column of the main drawer 22 comprises stock symbols of stocks traded on the NYSE.

The "Bid" Column lists bid prices per share by potential buyers of said stocks, which are the stock prices per share that such buyers are willing to pay for the stocks denoted in the "Symbol" column.

The "Offer" column of the main drawer 22 lists offer prices per share by potential sellers of said stocks, which are the stock prices per share that such sellers are willing to accept as payment for the stocks denoted in the "Symbol" column.

The "Bid Vol." column of the main drawer 22, which is a number of shares associated with a price in the "Bid" column, has a specific meaning that depends on what appears in the "Status" column. The "Offer Vol." column of the main drawer 22, which is a number of shares associated with a price in the "Offers" column, has a specific meaning that depends on what appears in the "Status" column. Depending on what appears in the "Status" column, data may or may not appear in the "Bid Vol." and "Offer Vol." columns. In FIG. 8, there is no data displayed in the "Bid Vol." and "Offer Vol." columns.

The "Status" column of the main drawer 22 indicates the status of the offer to buy or sell shares of stock, or other timely trading information concerning the stock associated with the stock identified in the "Symbol" column. The text appearing in the "Status" column of FIG. 8 are "Its Ind" and "Cancel Its Ind". "Its Ind" may denote, inter alia, that an offer to buy or sell has been transferred to another regional exchange (e.g., Pacific Exchange). "Cancel Its Ind" follows "Its Ind" and may denote, inter alia, that the "Bid" or "Offer" associated with "Its Ind" was successfully transacted on the another regional exchange. Other possible entries in the "Status" column include, inter alia: "Halt" (i.e., trading has been halted); "Delay" (i.e., trading has been delayed); "Resume" (i.e., trading has resumed following a "Halt"); and "MOC Imb Buy" (an imbalance exists at Market On Close such that there is an excess of buyers or sellers for the stock indicated in the "Symbol" column); "Bid new", "Offer new", "Bid cancel", "Offer Cancel" (block of stock of 25,000 or more shares was placed for buy or sell, and said buy or sell was not executed for a period exceeding 30 seconds). Note that the "Bid Vol." or Offer Vol." column may display a value if the "Status" column displays "MOC Imd Buy" as illustrated infra in FIG. 17.

The "Halt Reason" column of the main drawer 22 is keyed to the "Status" column. For example, "Status—"Halt Reason="Halt"—"News Pending" may denote that trading has been halted until an expected news announcement is made. As a second example, "Status—"Halt Reason="Delay"—"News Pending" may denote that trading has been delayed until an expected news announcement is made (see e.g., FIG. 14). As a third example, "Halt Reason="Delay"—"Imb" may denote that trading has been delayed due to an imbalance or excess of buyers or sellers for the stock indicated in the "Symbol" column.

The Corp Act" column of the main drawer 22 may indicate an action taken by the corporation associated with the stock denoted in the "Symbol" column (e.g.; the corporation has had an ex-dividend; the corporation has applied for bankruptcy; etc.).

FIG. 8 shows the "Time" column of the main drawer 22 as being highlighted in a green color, which indicates that the rows have been sorted using "Time" as a sort key. Any column title ("Symbol", Bid", "Ask", etc.) can be used as a sort key such as by clicking on the column title that is to serve as the sort key. While FIG. 8 shows a descending sort based on "Time" (i.e., latest time appears in row 1, next latest time appears in row 2, etc.), the scope of the present invention includes both ascending sorts and descending sorts. Whether the sort is ascending or descending can be hard-coded or user-selected, for each sort key individually or for all sort keys collectively.

While the highlighting of the "Time" column of the main drawer 22 in FIG. 8 is by color (i.e., the green color), the highlighting could be via any manner that brings attention to the "Time" column, such as by color, grey shading, blinking, etc. Generally, whenever any entity (e.g., column, row, button) in any portion of the NYSE data display structure 20 appears highlighted in color, such highlighting could be alternatively accomplished in any manner that brings attention to the entity, such as by color, grey shading, blinking, etc.

FIG. 8 show the top two rows 28 of the main drawer 22 as being highlighted in green. Highlighting of any row ($R_{MAIN}$) in the main drawer 22 is done for a period of time $\Delta T_{MAIN}$ during which $R_{MAIN}$ is initially viewable (i.e., initially viewable to a user or viewer). $\Delta T_{MAIN}$ may be a predetermined period of time, namely a period of time that is established prior to the data feed being fed into the main drawer 22. After said period of time $\Delta T_{MAIN}$, the highlighting is turned off. The highlighting can alternatively be accomplished in any manner that brings attention to the any row $R_{MAIN}$, such as by color, grey shading, blinking, etc., as explained supra. The period of time $\Delta T_{MAIN}$ can be of any desired magnitude (e.g., 10 seconds, 20 seconds, 1 minute, etc.). The magnitude of the period of time $\Delta T_{MAIN}$ should be big enough for a typical viewer to take notice of the highlighted row $R_{MAIN}$. For example, a value of $\Delta T_{MAIN}$ that is less than one-tenth of a second is probably too short to be practical.

Figure 9:
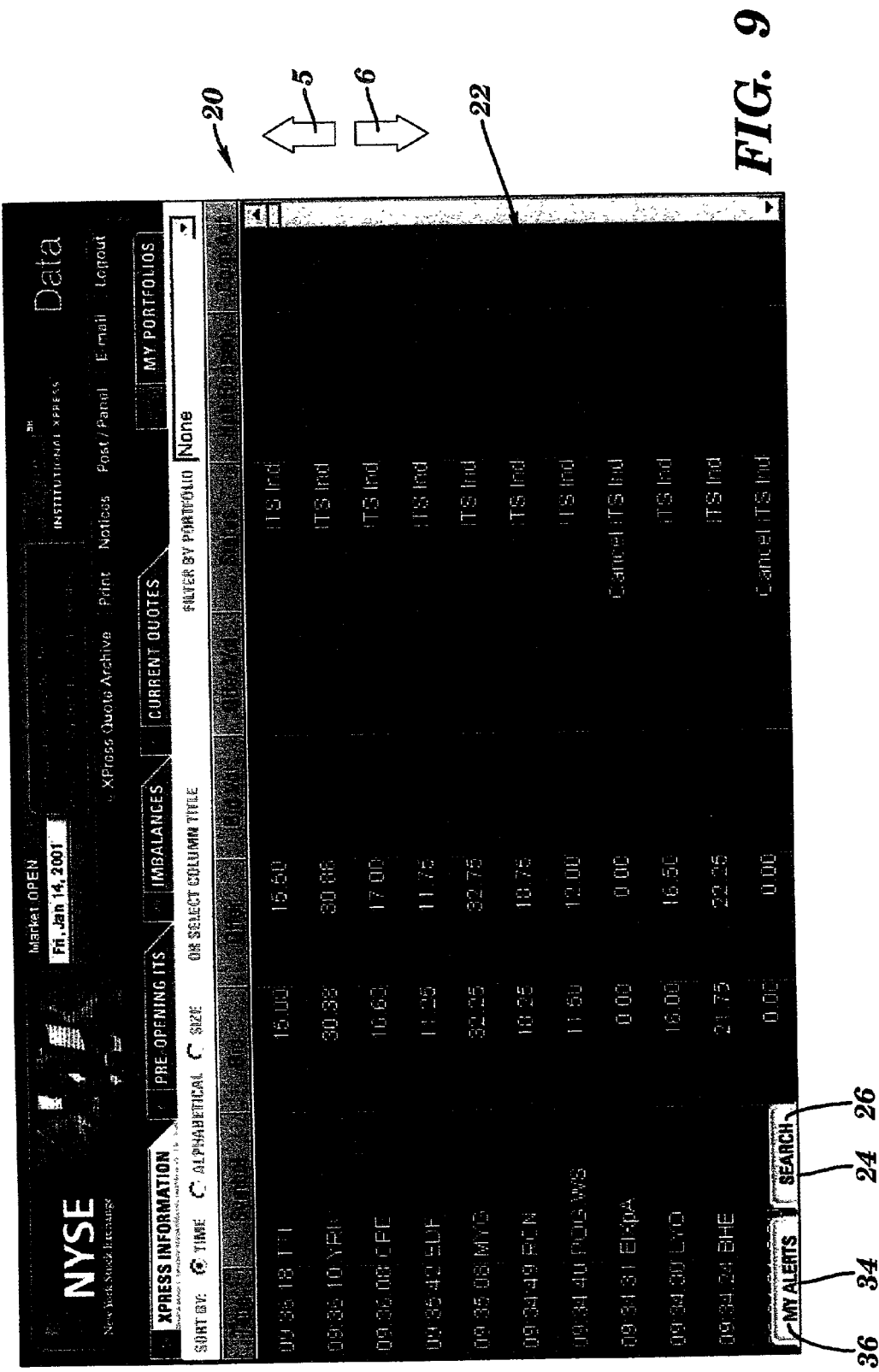

FIG. 9 depicts FIG. 7 such that the main drawer 22 displays the entire data feed 14 of FIG. 1. FIG. 9 differs from FIG. 8 primarily in that no row of the main drawer 22 of FIG. 9 is highlighted, because all rows displayed in main drawer 22 in FIG. 9 have been previously visible for the period of time $\Delta T_{MAIN}$.

Figure 10:
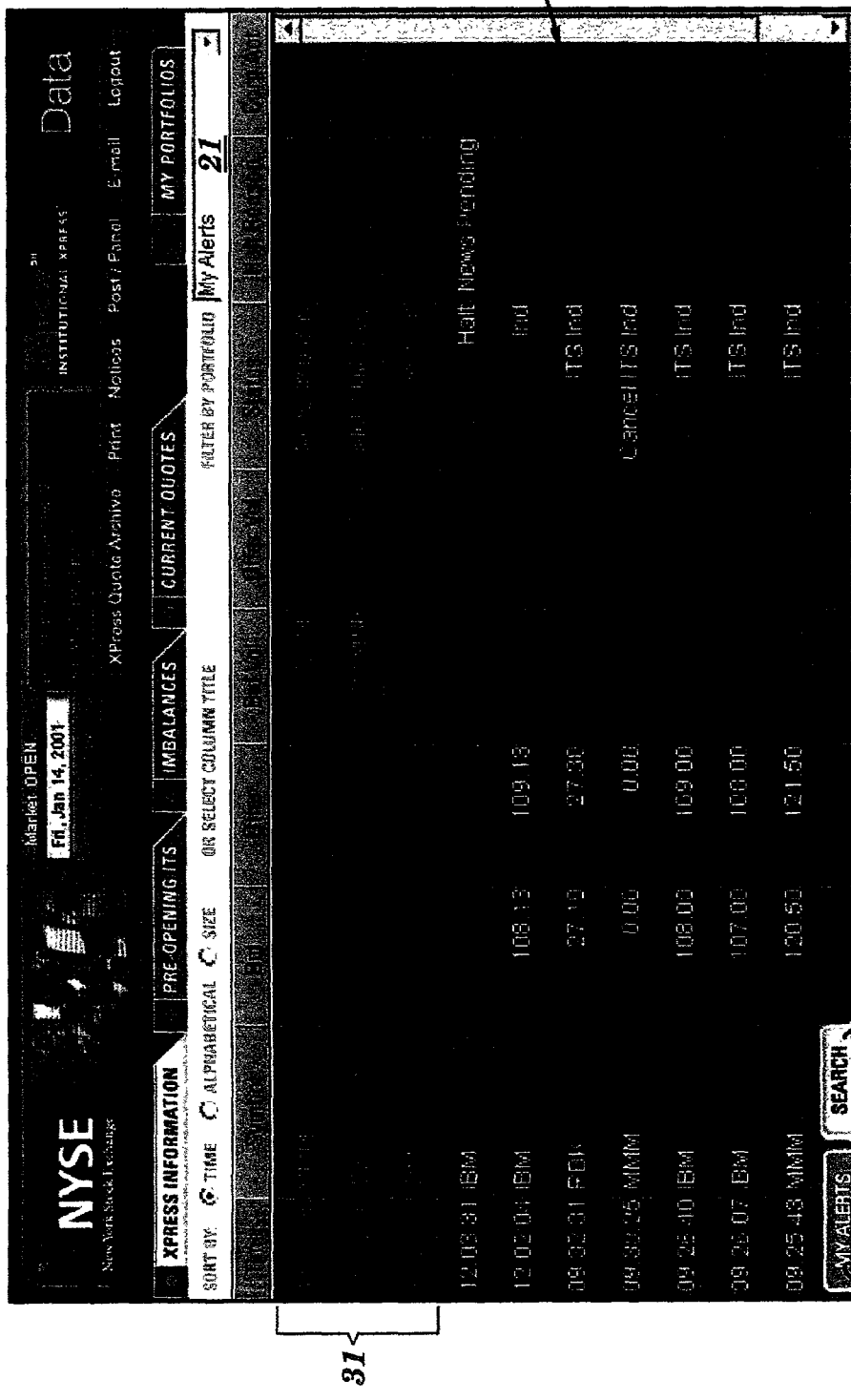

FIG. 10 depicts FIG. 7 such that the main drawer 22 displays a "portfolio subset" of the data feed 14. A "portfolio subset" is defined herein as one or more subsets, wherein each subset is associated with a stock symbol. FIG. 10 differs from FIG. 8 primarily in that in FIG. 8 the main window 22 displays stocks of the entire data feed 14, while in FIG. 10 the main window 22 displays stocks of the portfolio subset of the data feed 14. The portfolio subset of the data feed 14 is denoted by the word "My Alerts" in the window 21 below "MY PORTFOLIOS" in the upper right portion of FIG. 10. The string "My Alerts" has been named to define a portfolio subset of three stocks denoted by stock symbols RBK, IBM, and MMM. Such naming and defining of "My Alerts" may be implemented by any method known to one of ordinary skill in the art. Thus the portfolio subset "My Alerts" of the data feed 14 is the portion of the data feed 14 that includes the stocks symbolized by RBK, IBM, and MMM, which is confirmed by the appearance of RBK, IBM, and MMM exclusively in the "Symbol" column of the main window 22 in FIG. 10. The portfolio subset associated with RBK, IBM, and MMM includes three subsets: a first subset associated with RBK, a second subset associated with IBM, and a third subset associated with MMM. Thus, the "subset" herein is associated with a stock symbol, and the portfolio subset is associated with one or more of such stock symbols. Accordingly, if the portfolio subset includes all subsets (i.e., all stock symbols) of the data feed 14, then the portfolio subset is all of the data feed 14. However, if the portfolio subset does not include all such subsets, then the portfolio subset is less than all of the data feed. The appearance of "My Alerts" in the window 21 causes only stocks associated with RBK, IBM, and MMM to be displayed in the main window 22, and excludes all stocks other than RBK, IBM, and MMM from being displayed in the main window 22.

The existence of the portfolio "My Alerts" causes the drawer 34 (with "MY ALERTS" on the tab 36) to exist. The drawer 34 is an example of an "Alerts" drawer which has a significance in relation to the "Search" drawer 24, wherein said significance will be discussed infra in conjunction with FIG. 12.

Based on the preceding discussion of FIGS. 8 and 10, the main window 22 displays a portion of the data feed 14, wherein the portion of the data feed 14 is: all of the data feed 14 as in FIG. 8; or less than all of the data feed 14 as with the portfolio subset of the data feed 14 in FIG. 10.

FIG. 10 also show the top three rows 31 of the main drawer 22 as being highlighted in green color. The highlighting of the top three rows 31 in FIG. 10 has the same significance as does the highlighting of the top two rows 28 in FIG. 8 discussed supra.

Figure 11:
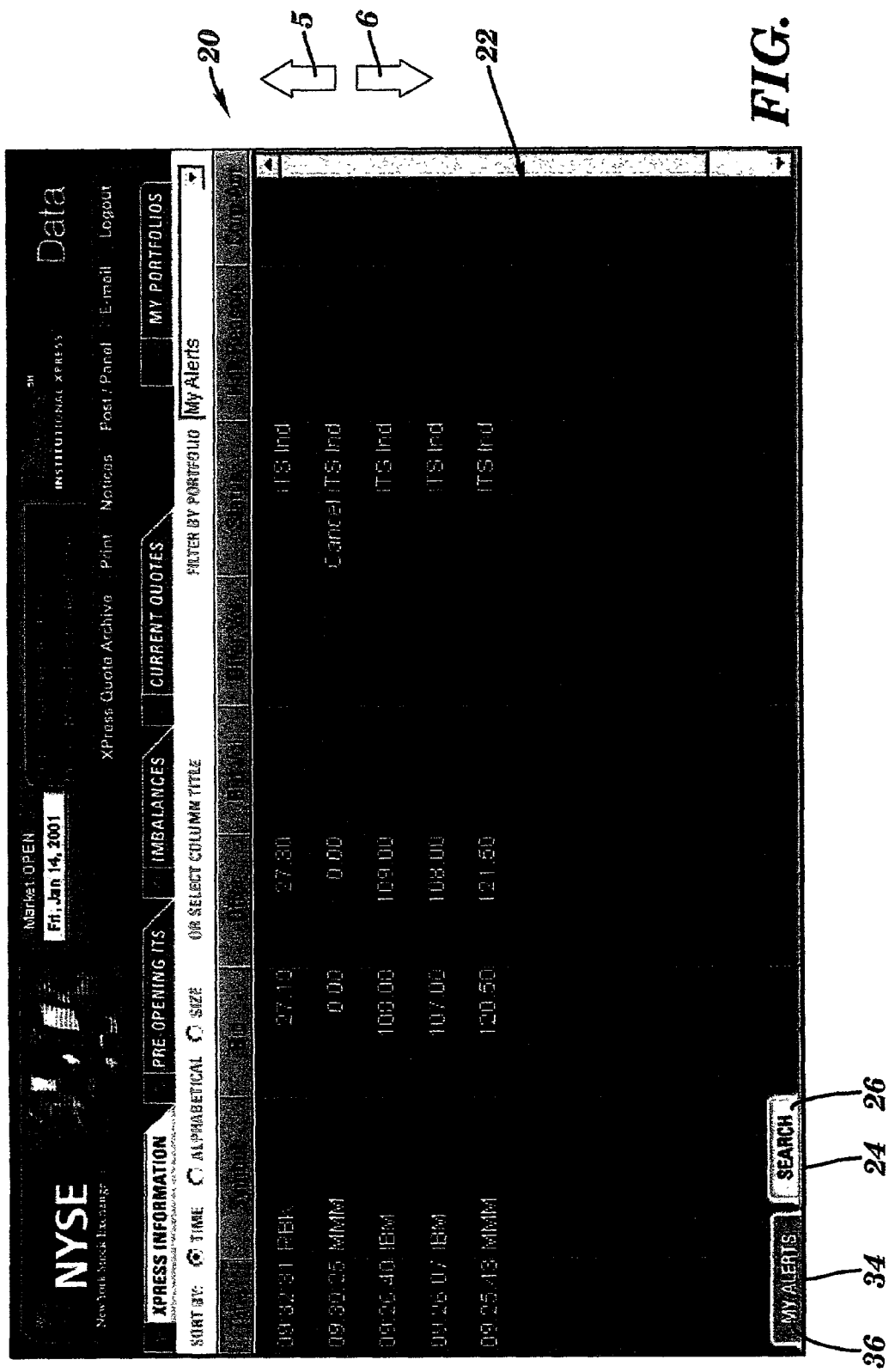

FIG. 11 depicts FIG. 7 such that the main drawer 22 displays the "My Alerts" portfolio subset of the data feed 14. FIG. 11 differs from FIG. 10 primarily in that no row of the main drawer 22 of FIG. 11 is highlighted, because all rows displayed in main drawer 22 in FIG. 11 have been visible for the predetermined period of time (i.e., for $\Delta T_{MAIN}$ discussed supra).

Figure 12:
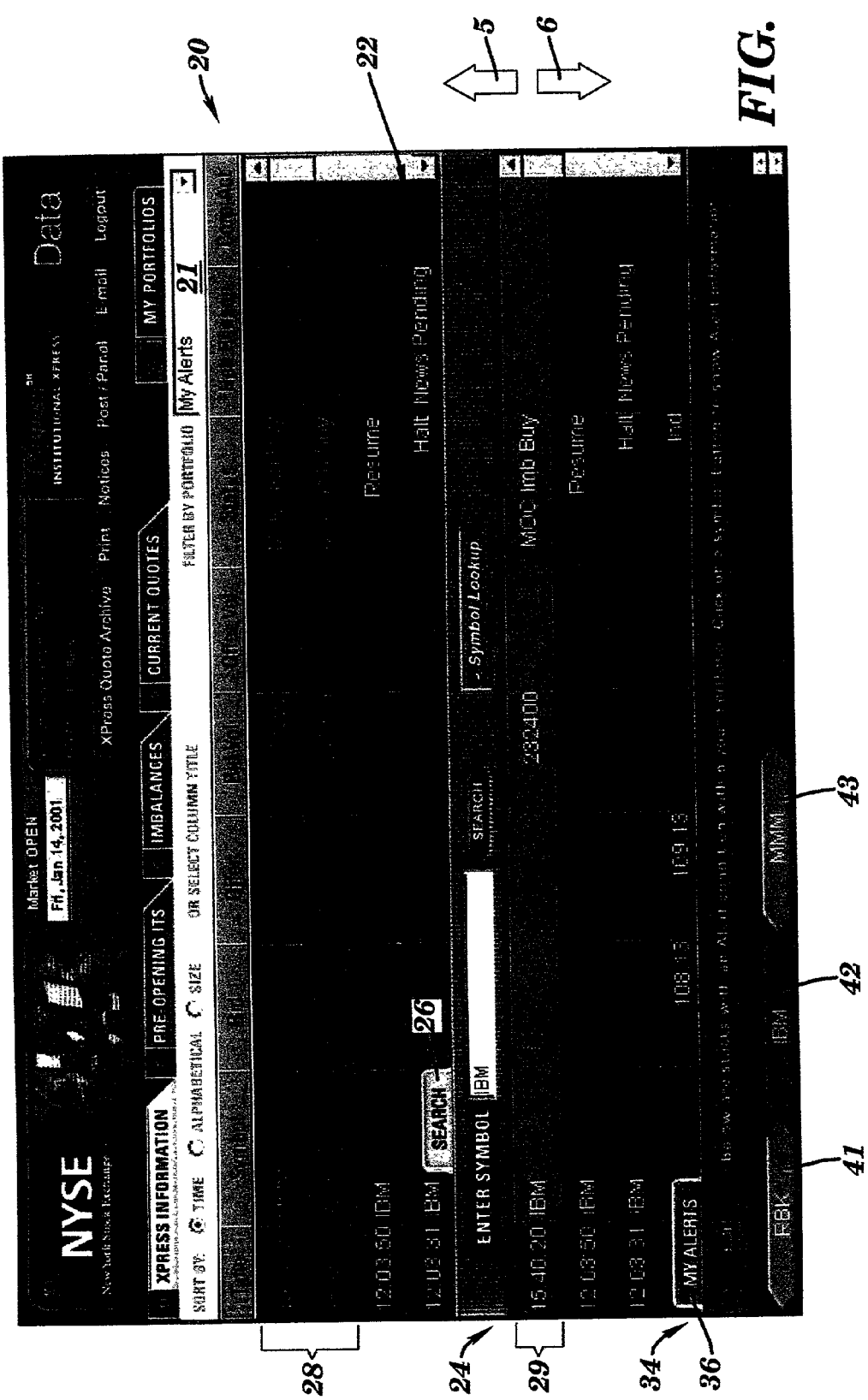

FIG. 12 depicts FIG. 7 such that the main drawer 22 displays the "My Alerts" portfolio subset of the data feed 14. In FIG. 12, the Alerts drawer 34 (which has "MY ALERTS" on its tag 36) and the Search drawer 24 (which has "SEARCH" on its tag 26) are each open, and each visibly displays data. The Alerts drawer 34 includes buttons 41, 42, and 43, respectively labeled with the stock symbols RBK, IBM, and MMM which are defined for the "My Alerts" portfolio as discussed supra. The Search drawer 24 is arranged in the spreadsheet for mat and has essentially the same format as the main drawer 22 with respect to the columns. The data displayed by the Search drawer 24 at any given time is one subset of data, namely data associated one of the three stock symbols RBK, IBM, and MMM defined by the "My Alerts" portfolio. The one stock symbol for which data is displayed in the Search drawer 24 is determined which of the three buttons 41, 42, and 43 is selected, such as by a user or viewer. If the button 41 is selected, then the Search drawer 24 will display the subset of the data feed 14 that is associated with the RBK stock symbol. If the button 42 is selected, then the Search drawer 24 will display the subset of the data feed 14 that is associated with the IBM stock symbol. If the buttons 43 is selected, then the Search drawer 24 will display the subset of the data feed 14 that is associated with the MMM stock.

While the "My Alerts" portfolio subset includes three stock symbols (RBK, IBM, and MMM), a portfolio subset may generally have M stock symbols (M≧1), with an associated Alerts drawer having M buttons denoted as $B_1$, $B_2$, ..., $B_M$, and with an associated Search drawer 24. The buttons $B_1$, $B_2$, ..., $B_M$ respectively identify a subset $S_1$, $S_2$, ..., $S_M$ of the data feed 14. Selection of button $B_m$ (m=1, 2, ..., M) causes the Search drawer 24 to dynamically display $S_m$ in spreadsheet format. Since the "My Alerts" portfolio subset is associated with the Alerts drawer 34 of buttons, the "My Alerts" portfolio subset may be equivalently viewed as a portfolio of buttons. Such a portfolio of buttons is selectable (e.g., user selectable) from a menu that includes at least one such portfolios of buttons (e.g. a plurality of portfolios of buttons). Thus, if K portfolios of buttons were available to be selected (K≧1), the NYSE data display structure 20 would include K Alert drawers and K associated Search drawers.

FIG. 12 shows the "Time" column of the main drawer 22 as being highlighted in a green color, which indicates that the rows of the main drawer 22 have been sorted using "Time" as a sort key. All aspects of sorting columns of the main drawer 22, and of associated highlighting, that was discussed supra in conjunction with FIG. 8 apply likewise to the main drawer 22 in FIG. 12. Additionally, the Search drawer is also sorted using "Time" as a sort key.

Generally, a sorting of the main drawer 22 in accordance with a sort key causes a sorting of the Search drawer in accordance with the same sort key. Further, a sorting of the main drawer 22 in accordance with a sort key causes a sorting of each additional drawer that is sortable in accordance with the same sort key.

Inversely, the scope of the present invention includes sorting the Search drawer 24 in accordance with a sort key, which causes a sorting of the main drawer 22 in accordance with the sort key. Further, a sorting a first drawer of the additional drawers in accordance with a sort key causes a sorting in accordance with the sort key of the main drawer 22 and of all remaining drawers of the data display structure which are sortable in accordance with the sort key.

The various sorting capabilities described supra in which a sort in a first drawer triggers a sort in a second drawer illustrates the following feature of the present invention. A first drawer of a data display structure (e.g, the NYSE data display structure 20) is adapted to display content as a function of a user command that is directed to a second drawer of the data display structure. The previous feature of the present invention is further supported by selection of a button in the Alert Drawer to determine which stock is to be displayed in the Search drawer.

In FIG. 12, all data of the data feed 14 at a given time stamp and relating to a given stock symbol is displayed in no more than one row of the main drawer 22 and of the Search drawer 24. More generally, all data of the data feed 14 at a given time stamp and relating to a given sort key of the main drawer 22 is displayed in no more than one row of the main drawer 22 and of the Search drawer 24.

FIG. 12 shows the top two rows 28 of the main drawer 22 as being highlighted in green, similar to what was shown supra for the top two rows 28 of the main drawer 22 in FIG. 8. The discussion supra relating to such highlighting of the top two rows 28 of the main drawer 22 in FIG. 8 applies likewise to the highlighting of the top two rows 28 of the main drawer 22 in FIG. 12. In FIG. 12, the top row 29 of the Alerts drawer 34 is shown as being highlighted in orange, which is analogous to what was shown supra for the top two rows 28 of the main drawer 22 in FIG. 8. The discussion supra relating to such highlighting of the top two rows 28 of the main drawer 22 in FIG. 8 applies to the highlighting of the top row 29 of the Search drawer 24 in FIG. 12. Accordingly, highlighting of any row ($R_{SEARCH}$) of the Search drawer 24 is done for a period of time $\Delta T_{SEARCH}$) during which the $R_{SEARCH}$ is initially viewable (i.e., initially viewable to a user or viewer). $\Delta T_{SEARCH}$ may be a predetermined period of time, namely a period of time that is established prior to the data feed being fed into the main drawer 22. After said period of time $\Delta T_{SEARCH}$, said highlighting is turned off the any row $R_{SEARCH}$. The period of time $\Delta T_{SEARCH}$ can be of any desired magnitude (e.g., 10 seconds, 20 seconds, 1 minute, etc.). The magnitude of the period of time $\Delta T_{SEARCH}$ should be big enough for a typical viewer to take notice of the highlighted row $R_{SEARCH}$. For example, a value of $\Delta T_{SEARCH}$ that is less than one-tenth of a second is probably too short to be practical.

FIG. 12 shows buttons 41 and 43 highlighted in bright orange color, which means that there is data in the Search drawer 24 that has not been viewable by a user or viewer. The buttons 41 and 43 will remain highlighted until such data in the Search drawer 24 becomes viewable. Such highlighting may be in any form (e.g., color, shades of gray, blinking, etc.) that facilitates distinguishing the highlighted buttons 41 and 43 from the unhighlighted button 42, as discussed supra. Note that the aforementioned highlighting of any button of the Alerts drawer 34 has caused the tab 36 of the Alerts drawer 34 to be also highlighted in bright orange color.

Figure 13:
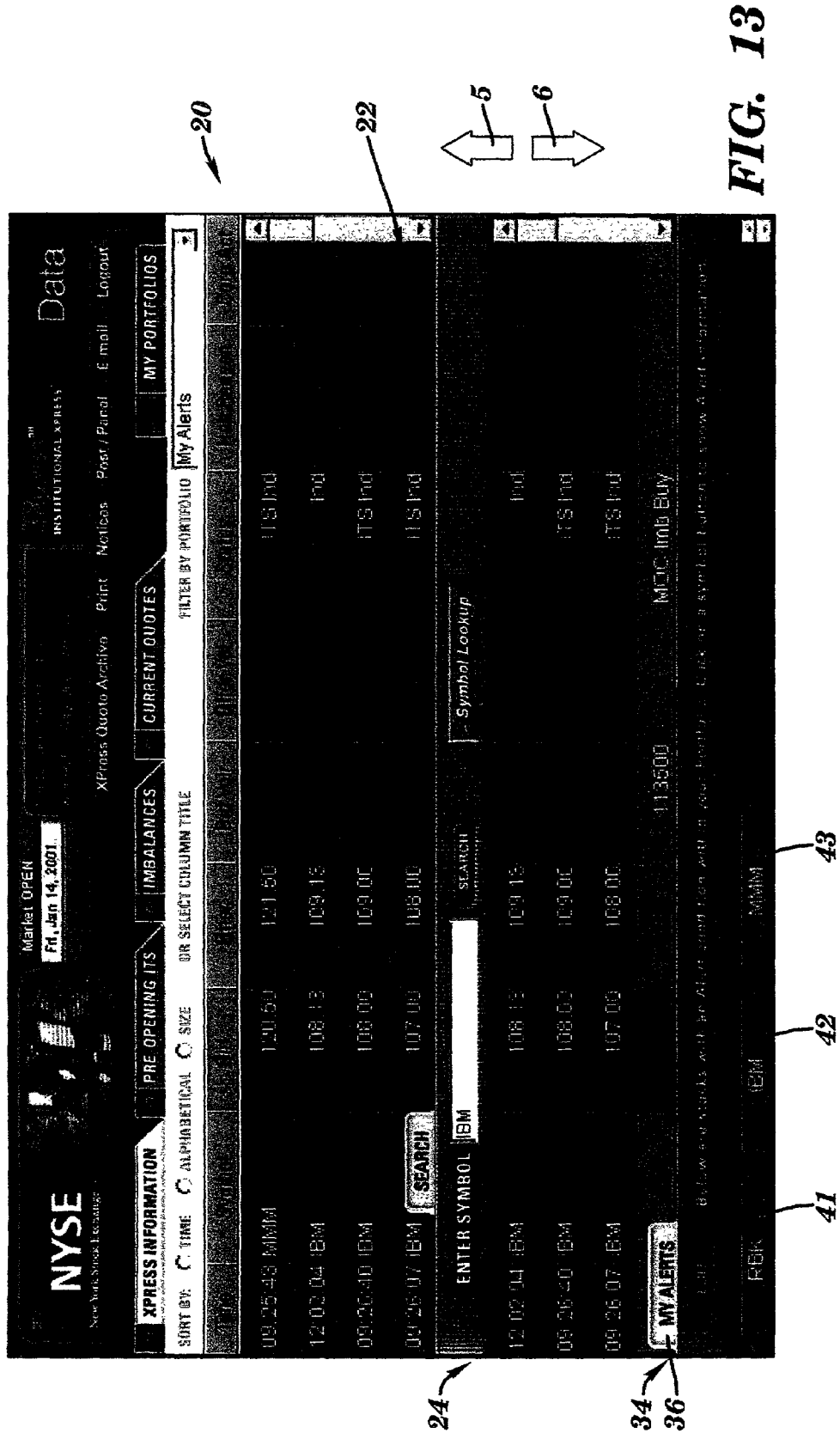

FIG. 13 depicts FIG. 7 such that the main drawer 22 displays the "My Alerts" portfolio subset of the data feed 14. A difference between FIG. 13 and FIG. 12 is that FIG. 13 shows the "Bid" column being sorted with "Bid" as a sort key, while FIG. 12 shows the "Time" column being sorted with "Time" as a sort key. In FIG. 13, both the main drawer 22 and the Search drawer 24 are sorted in accordance with "Bid" as a sort key. Additionally in FIG. 13, none of the buttons in the Alerts drawer 34 are highlighted and, accordingly, the tab 36 (with the "MY ALERTS" label) is not highlighted.

Figure 14:
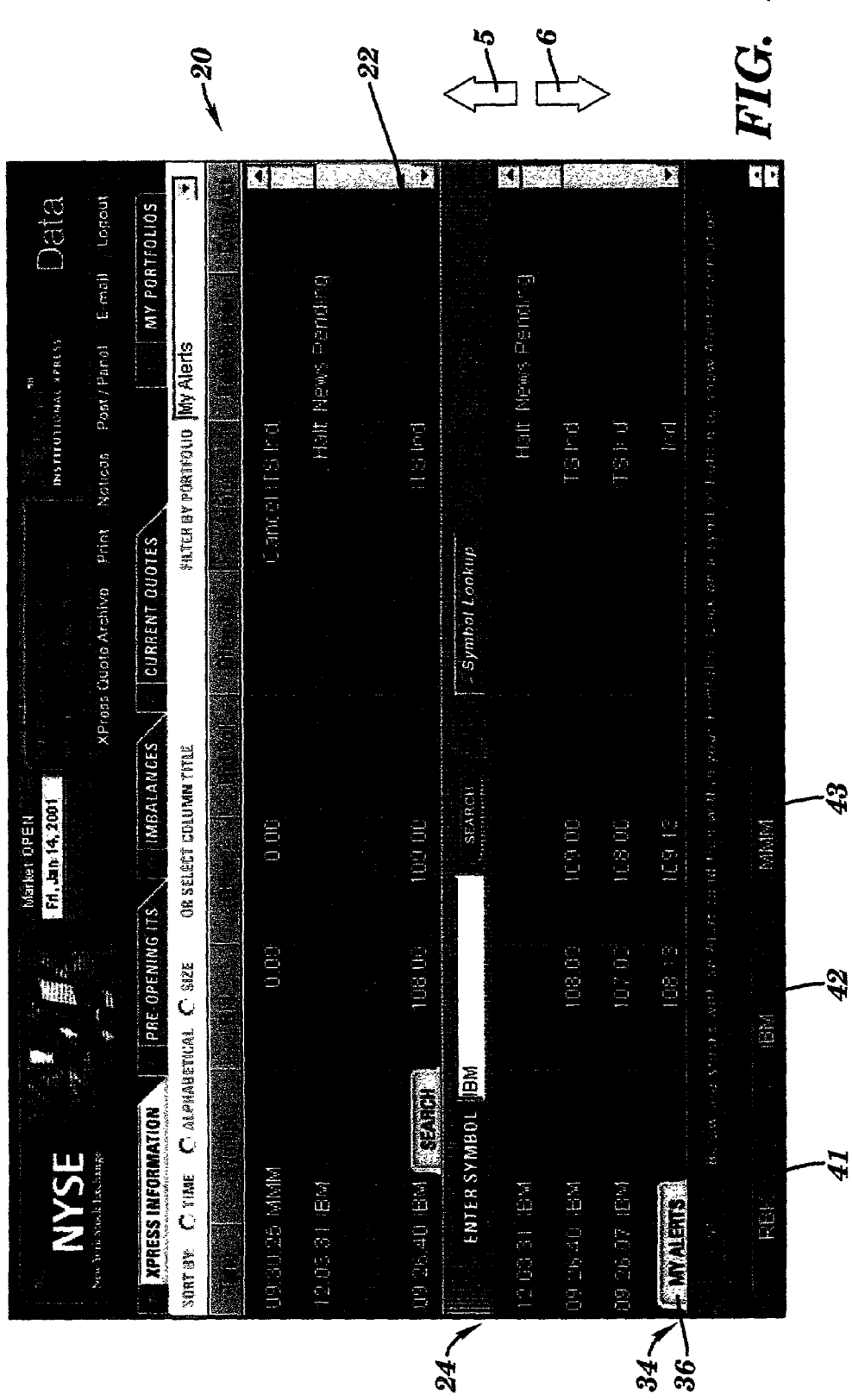

FIG. 14 depicts FIG. 7 such that the main drawer 22 displays the "My Alerts" portfolio subset of the data feed 14. A difference between FIG. 14 and 12 is that FIG. 14 shows the "Status" column being sorted with "Status" as a sort key, while FIG. 12 shows the "Time" column being sorted with "Time" as a sort key. In FIG. 14, both the main drawer 22 and the Search drawer 24 are sorted in accordance with "Status" as a sort key. Additionally in FIG. 14, none of the buttons in the Alerts drawer 34 are highlighted and, accordingly, the tab 36 (with the "MY ALERTS" label) is not highlighted.

Figure 15:
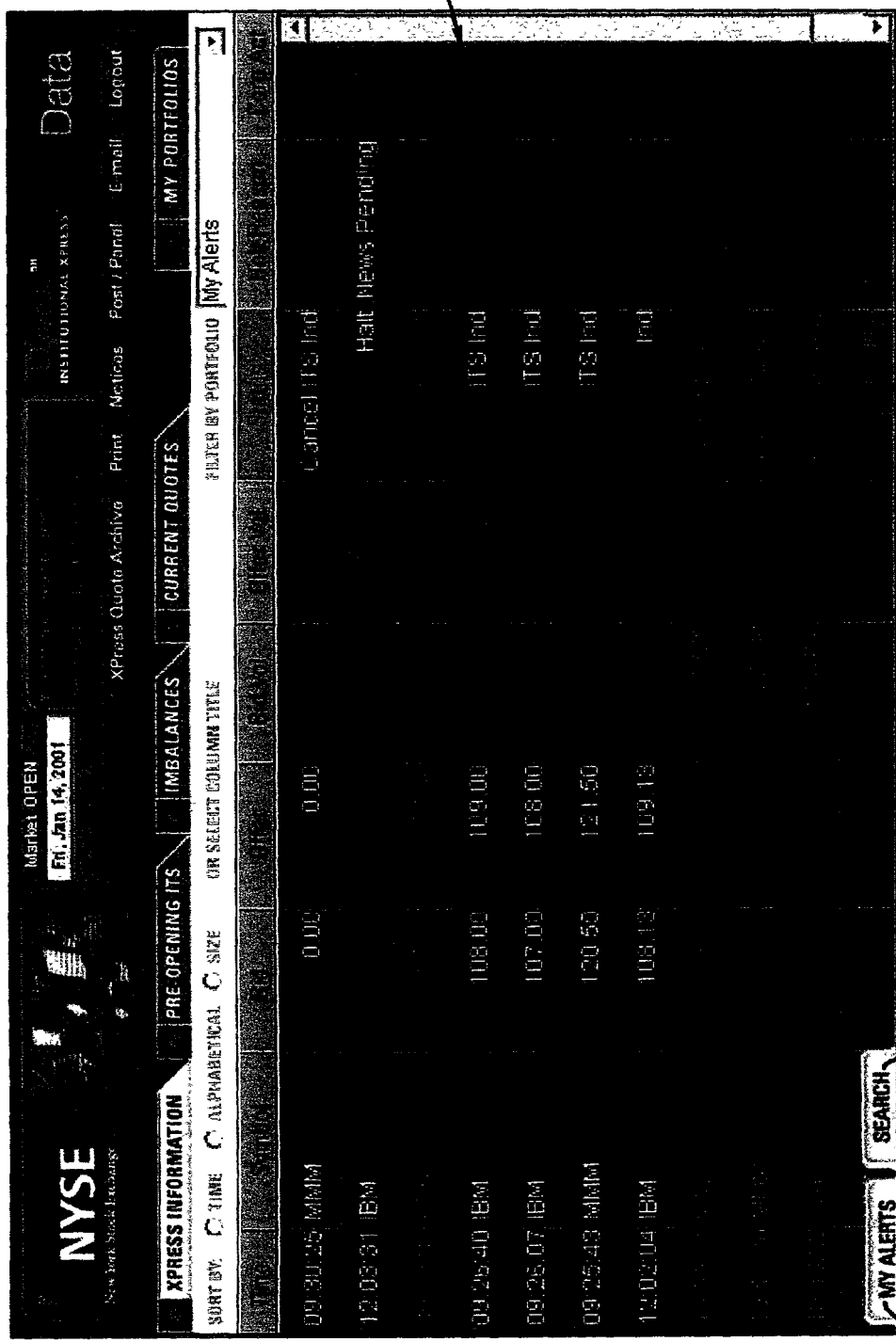

FIG. 15 depicts FIG. 7 such that the main drawer 22 displays the "My Alerts" portfolio subset of the data feed 14. FIG. 15 differs from FIG. 14 in that the Search drawer 24 and the Alert drawer 34 are each closed in FIG. 15 and each open in FIG. 14.

Figure 16:
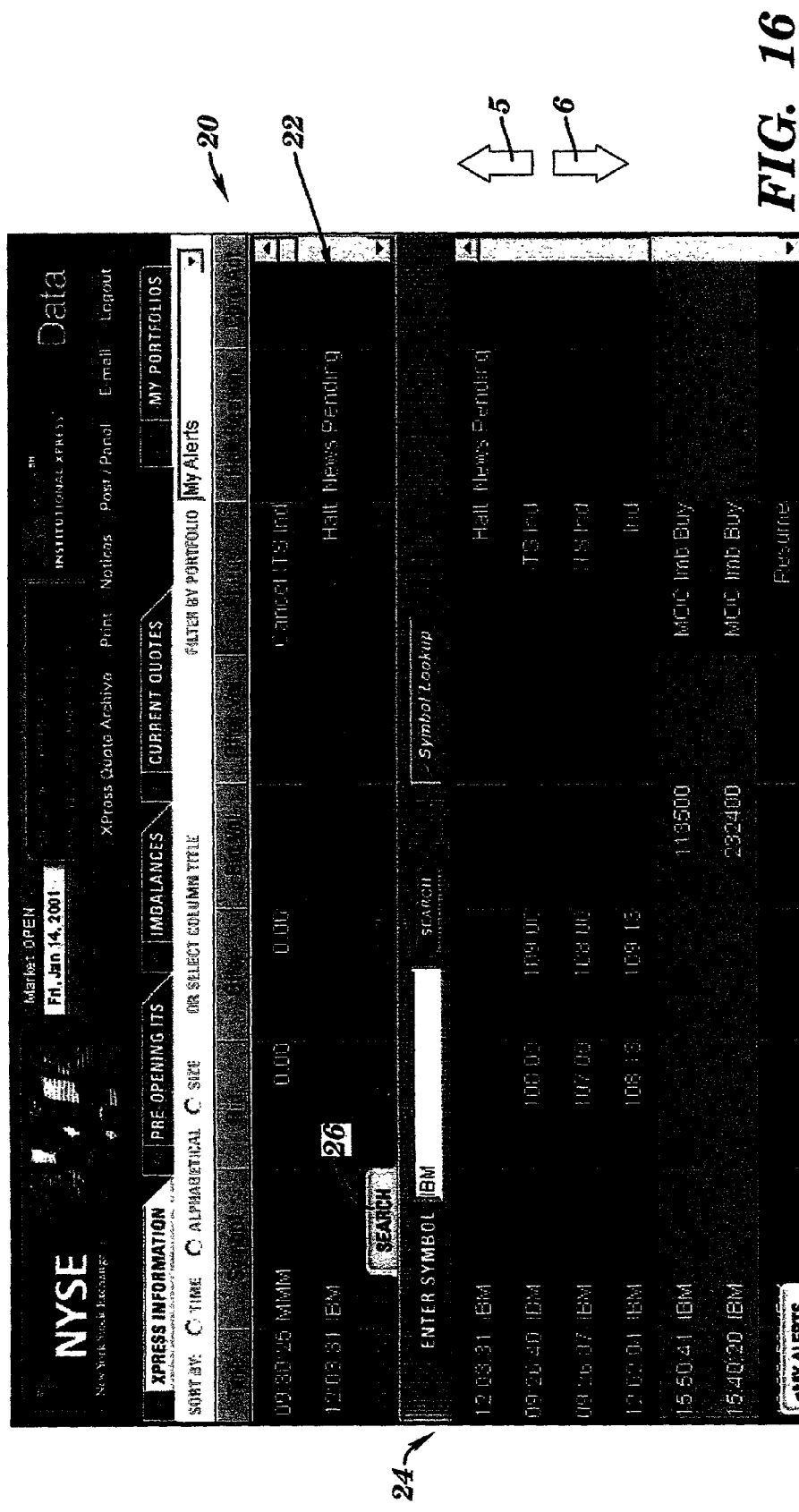

FIG. 16 depicts FIG. 7 such that the main drawer 22 displays the "My Alerts" portfolio subset of the data feed 14. FIG. 15 differs from FIG. 14 in that the Alert drawer 34 is closed in FIG. 15 and open in FIG. 14.

Figure 17:
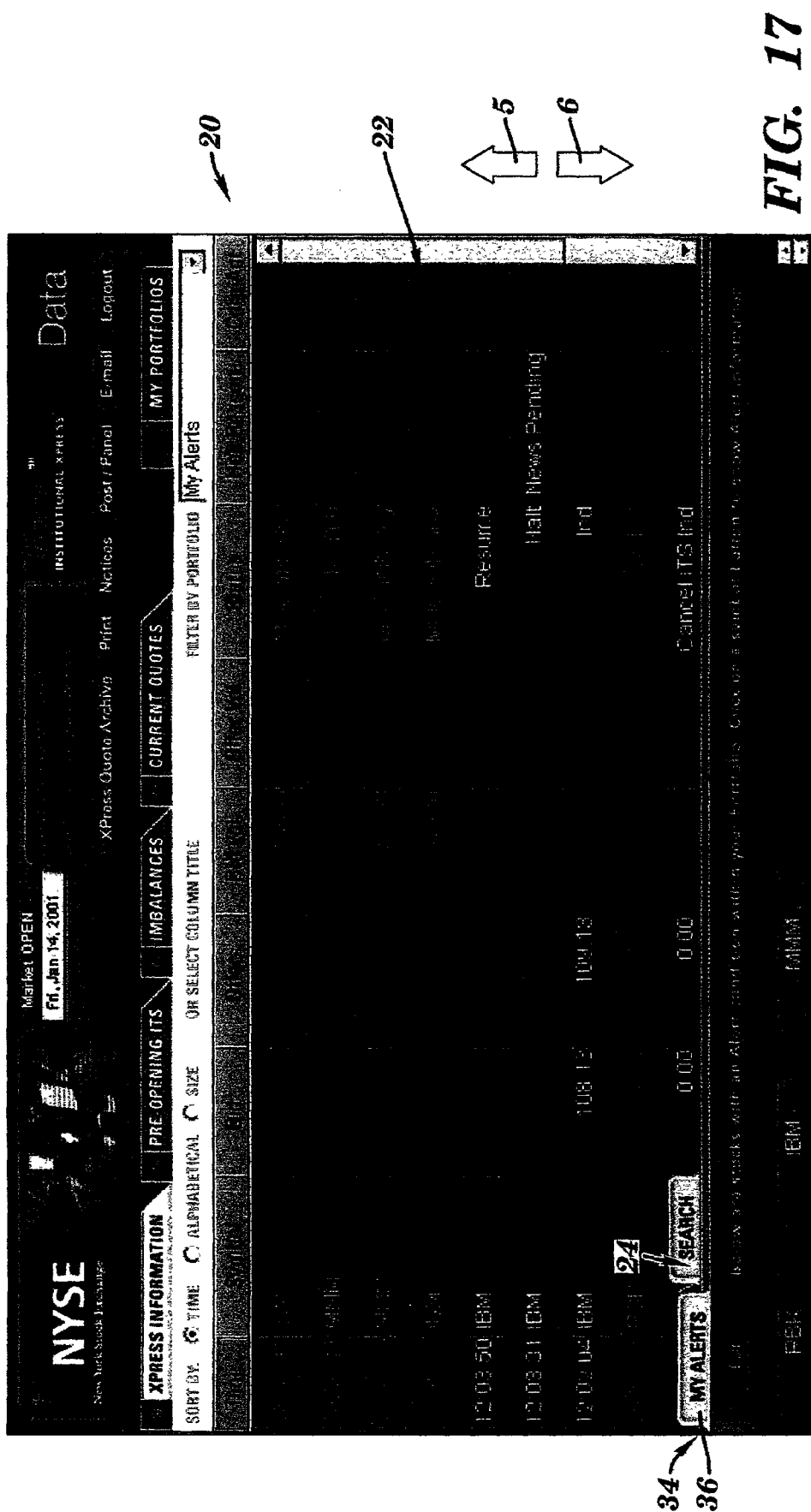
Figure 18:
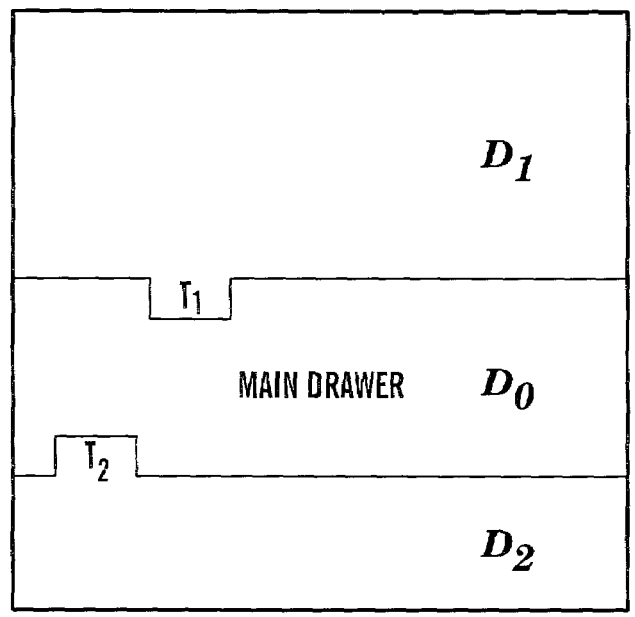
Figure 19:
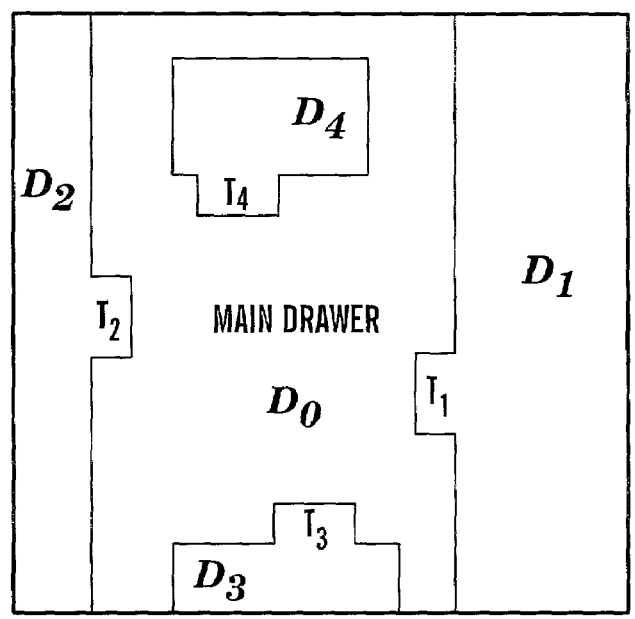
Figure 20:
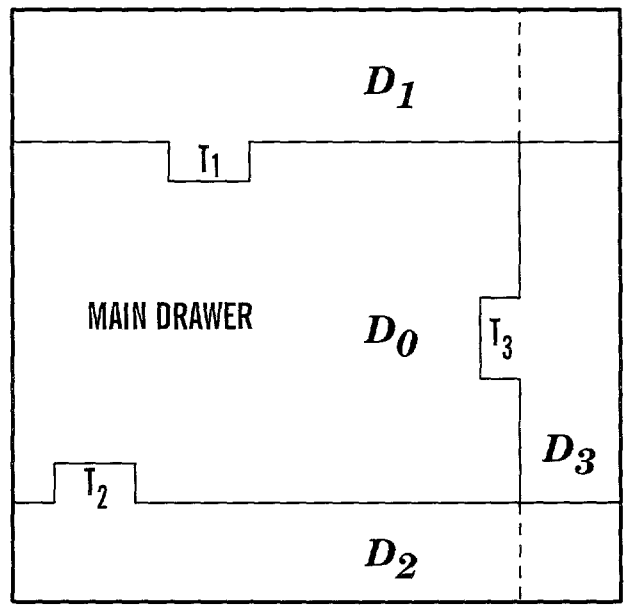
Figure 21:
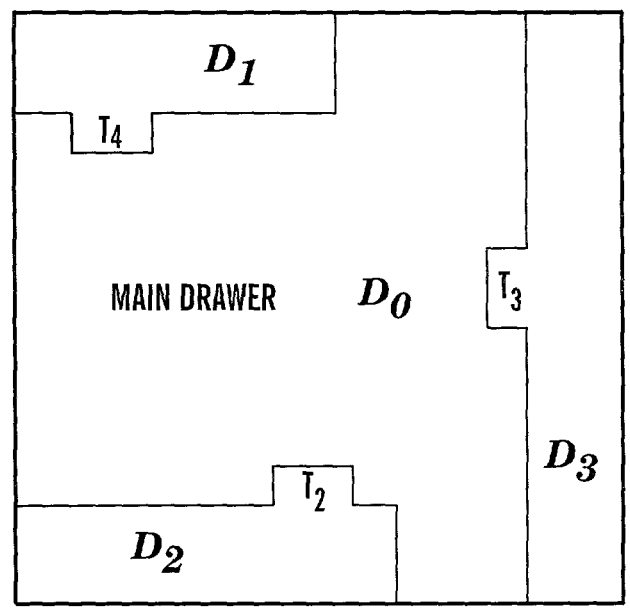
Figure 1:
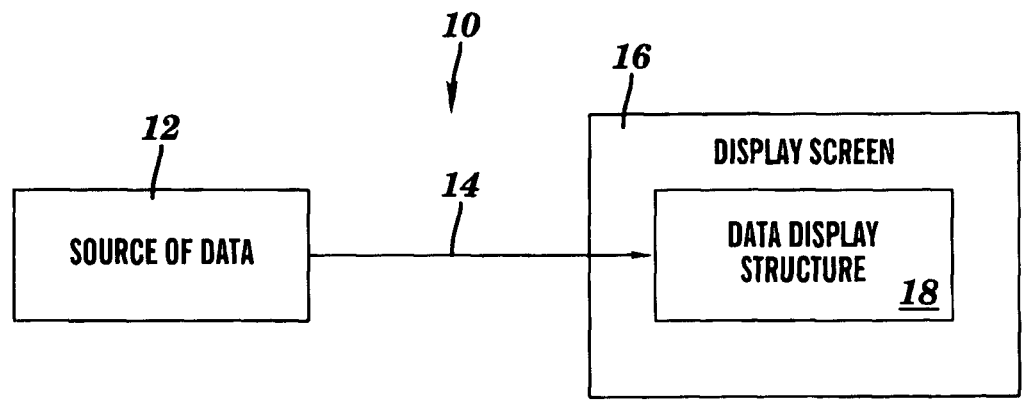
Figure 2:
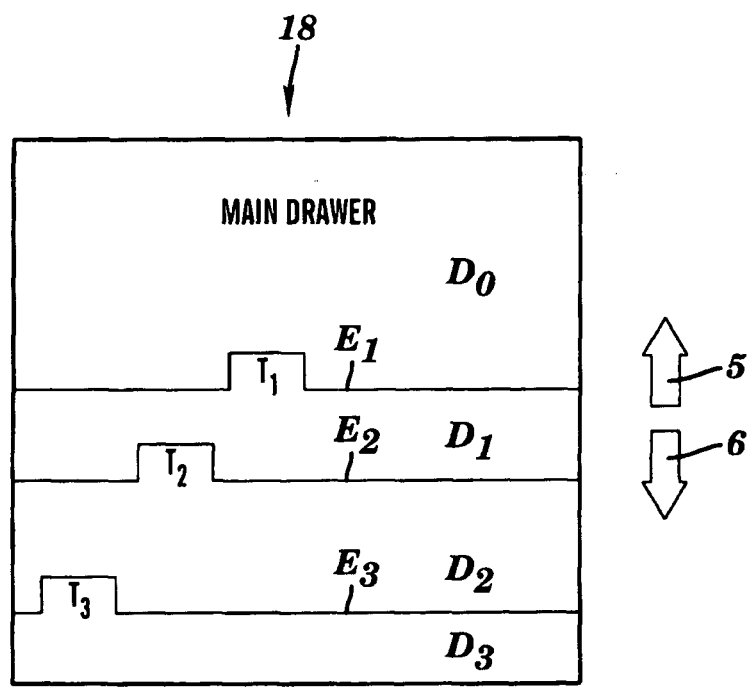
Figure 3:
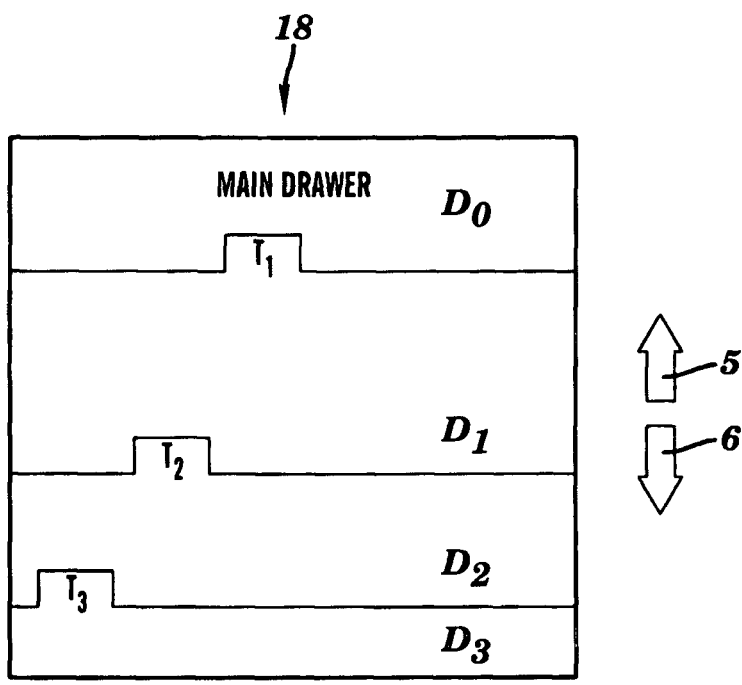
Figure 4:
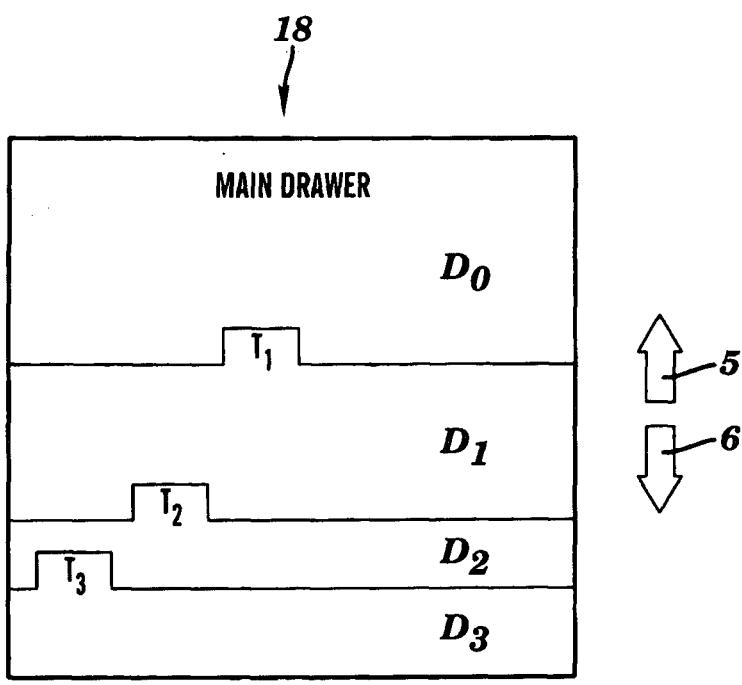
Figure 5:
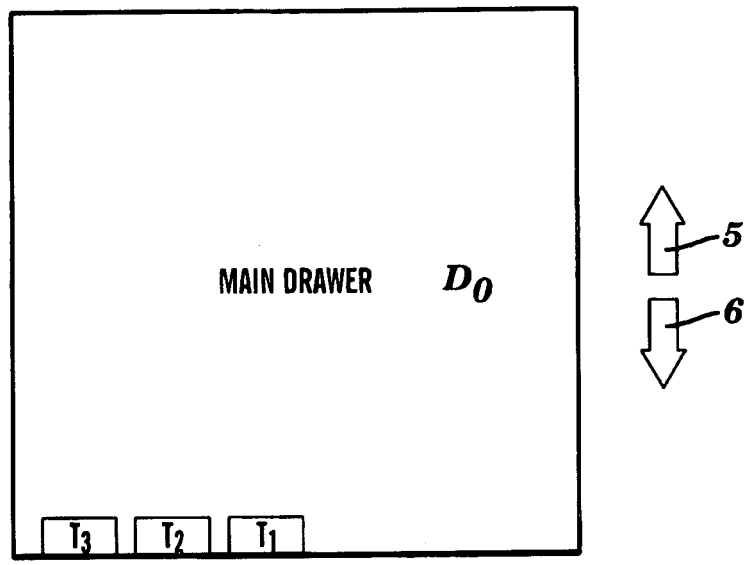
Figure 6:
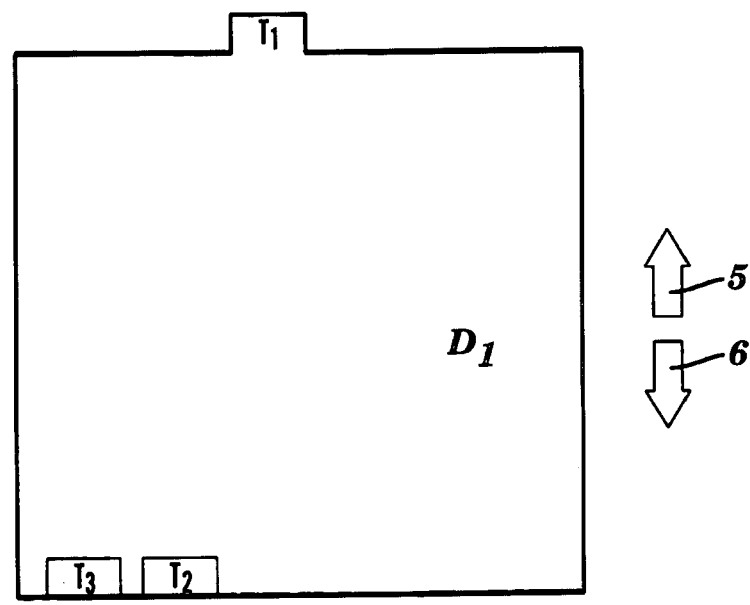
Figure 7:
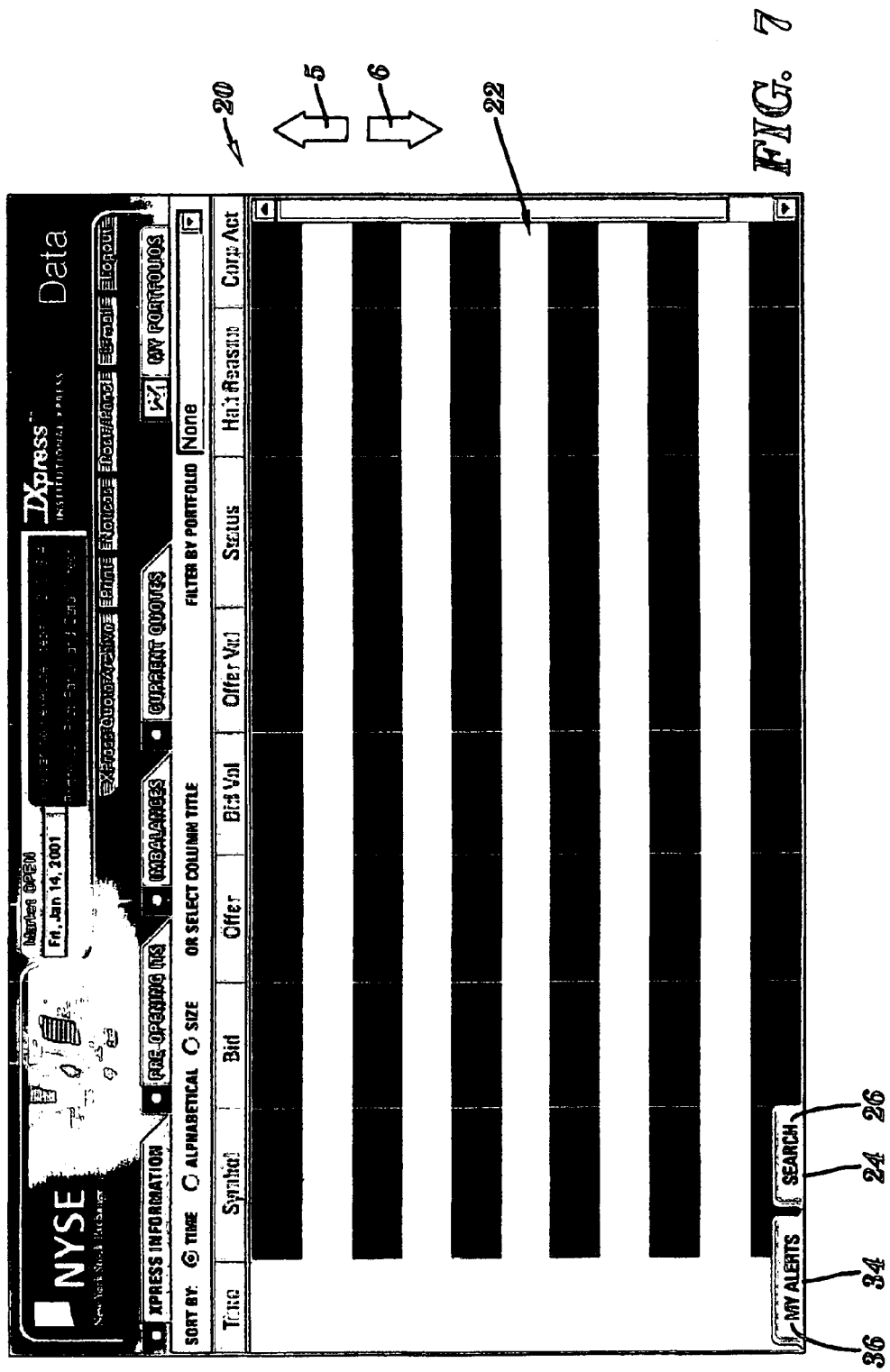
Figure 8:
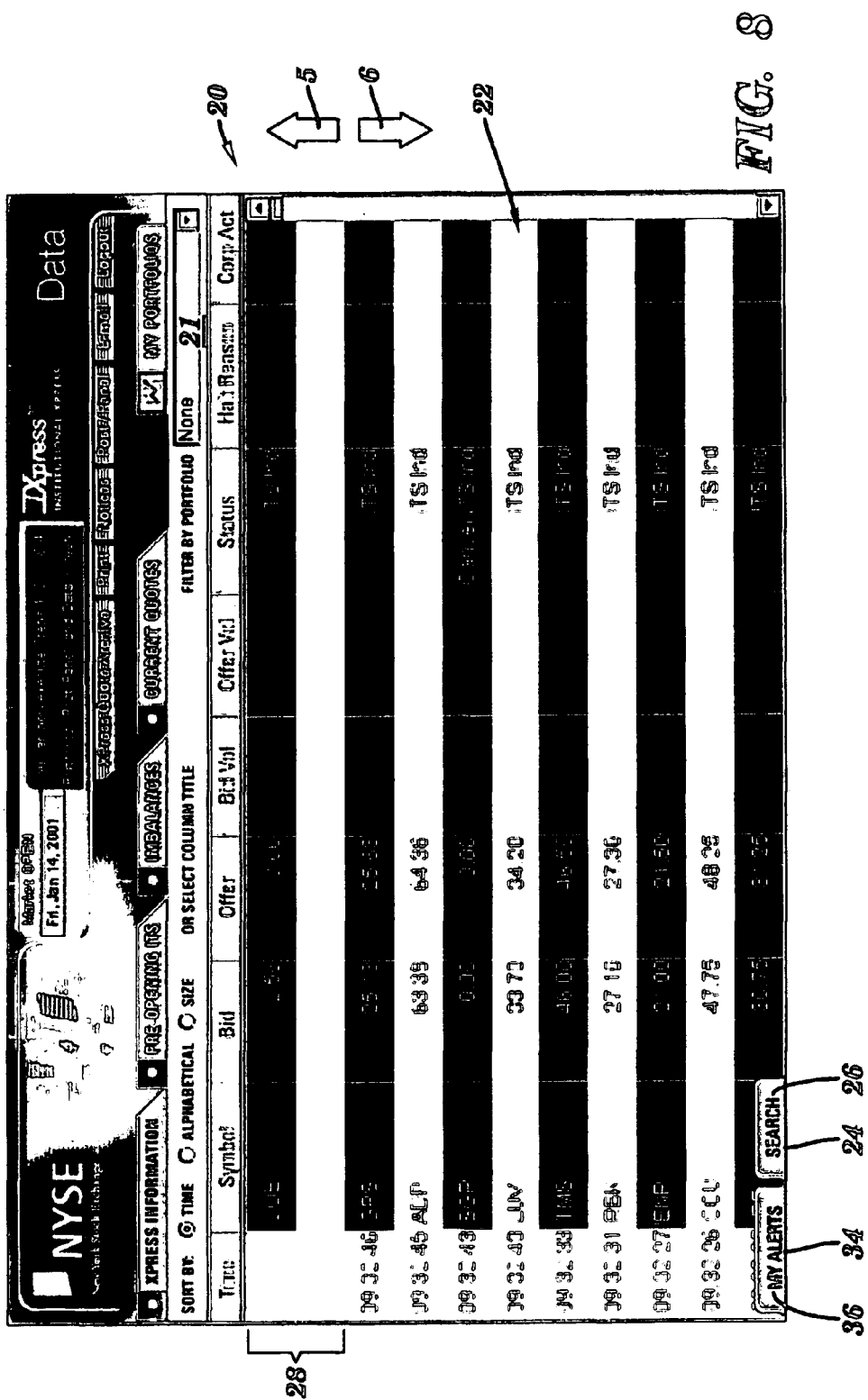
Figure 9:
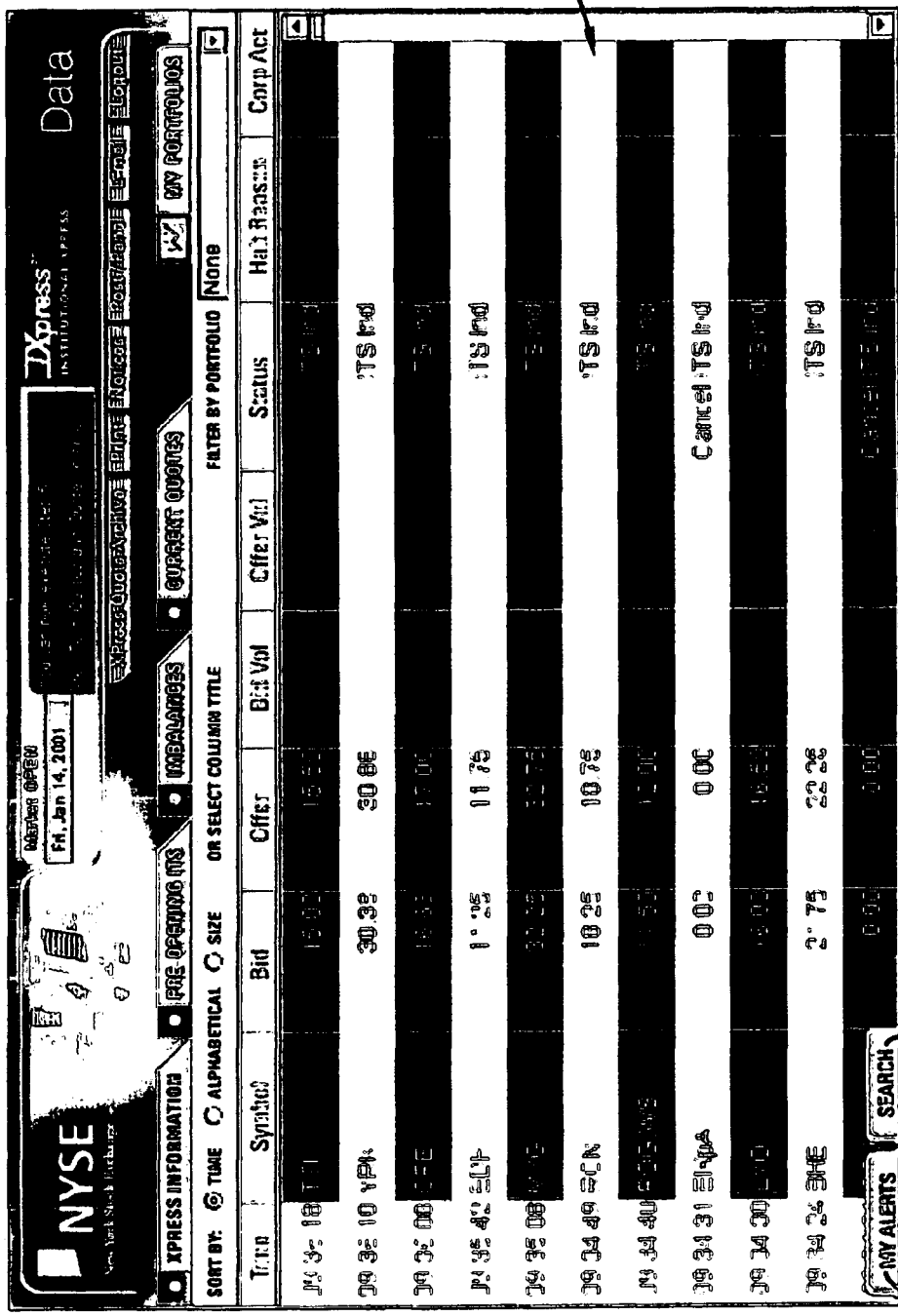
Figure 11:
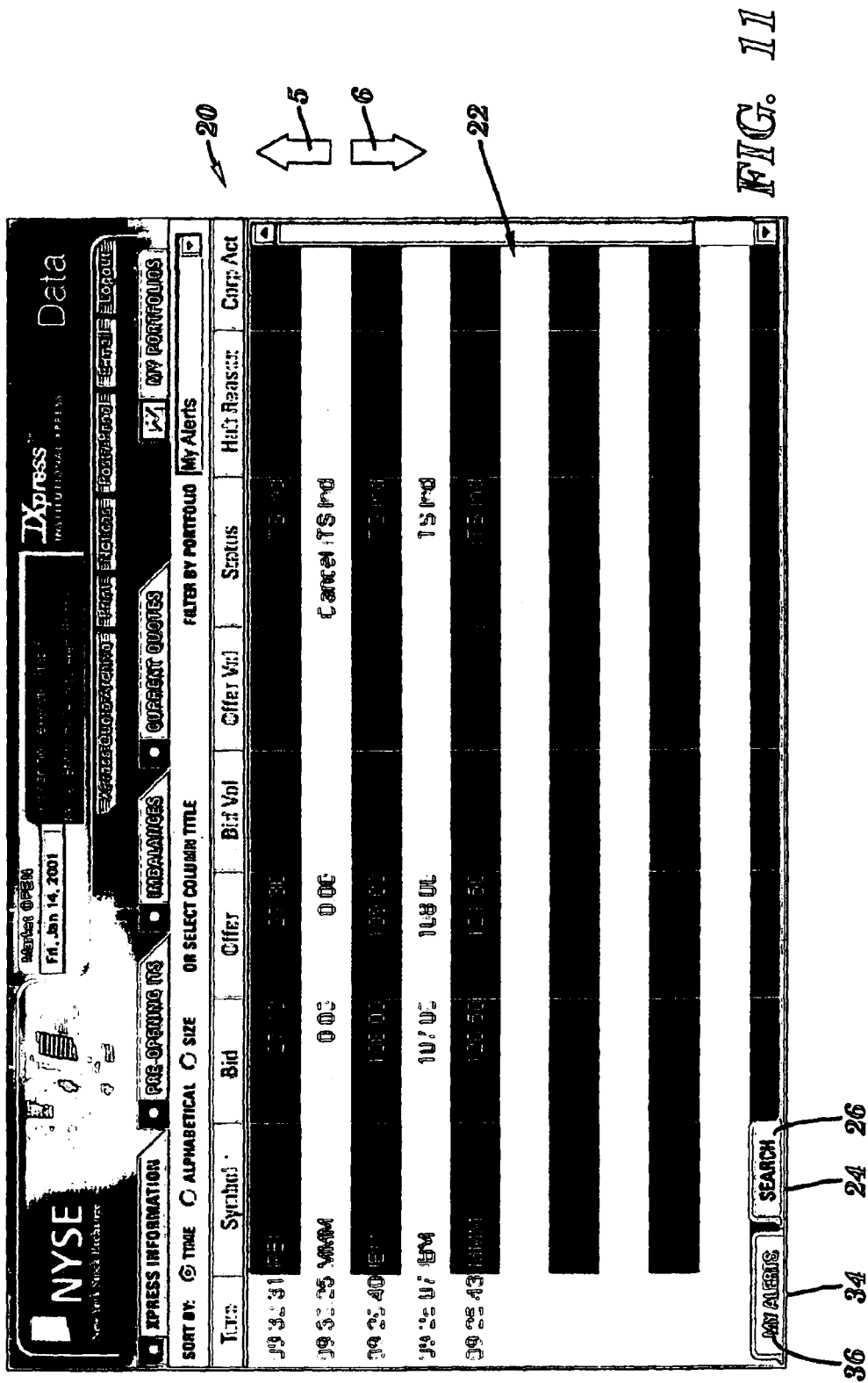
Figure 12:
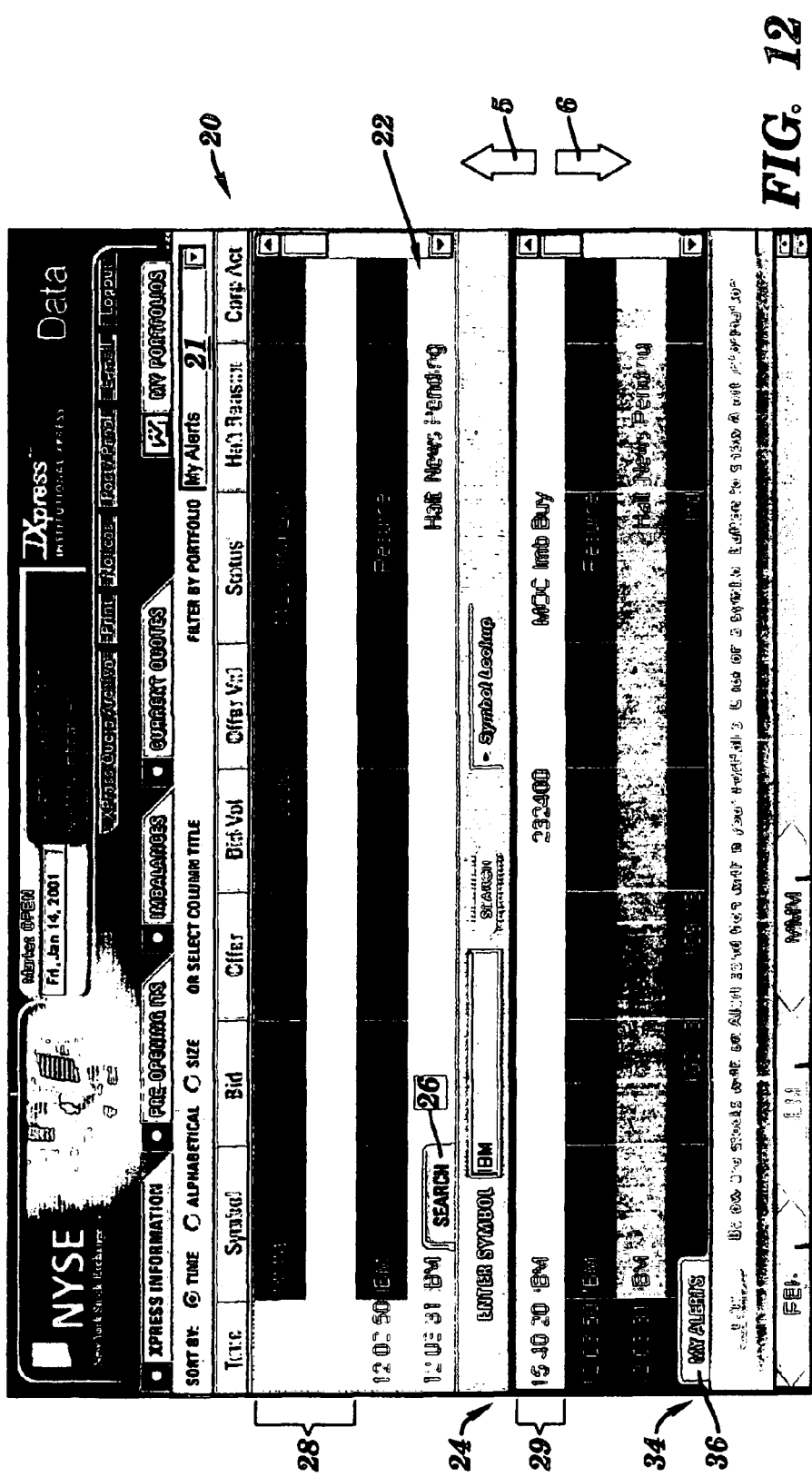
Figure 13:
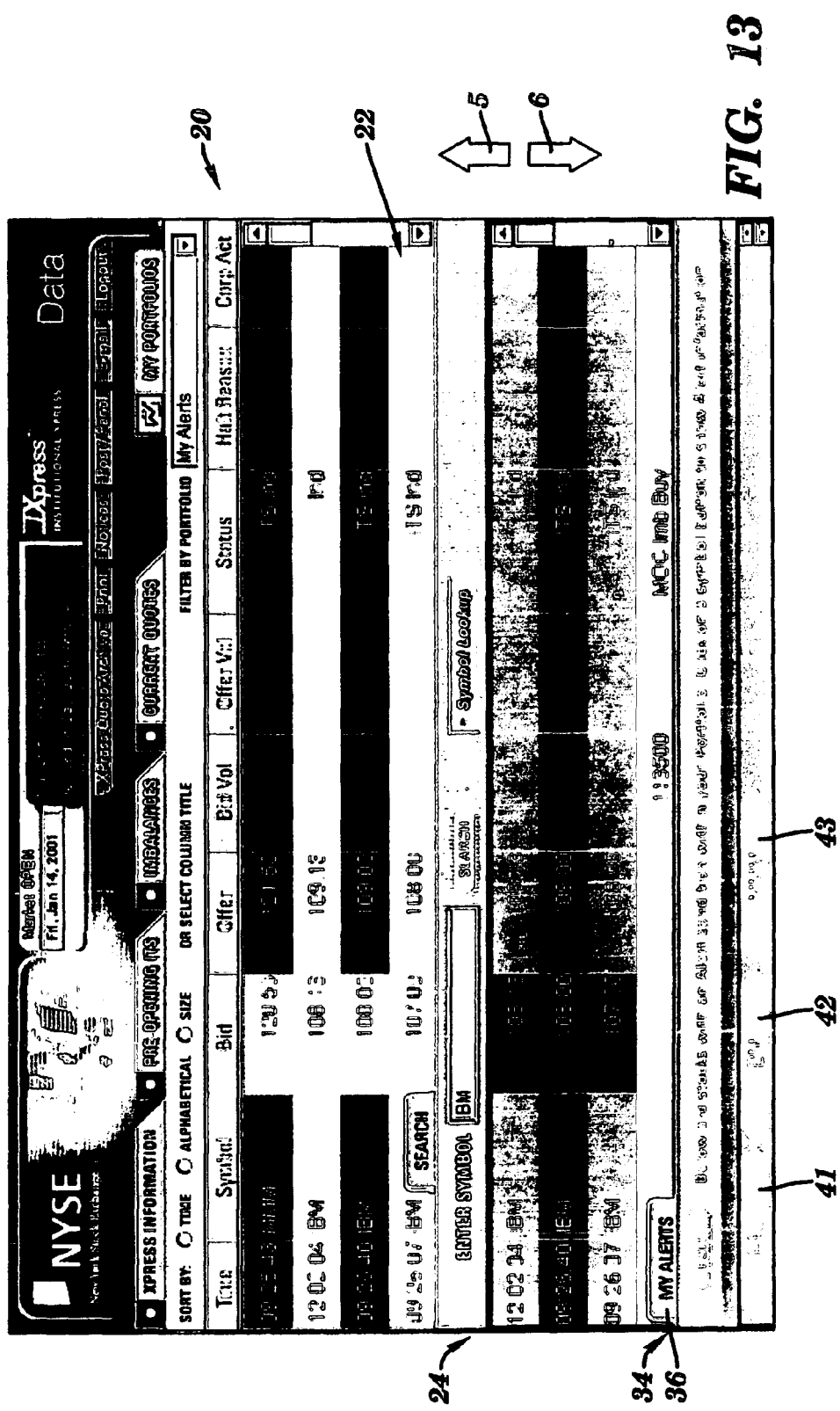
Figure 14:
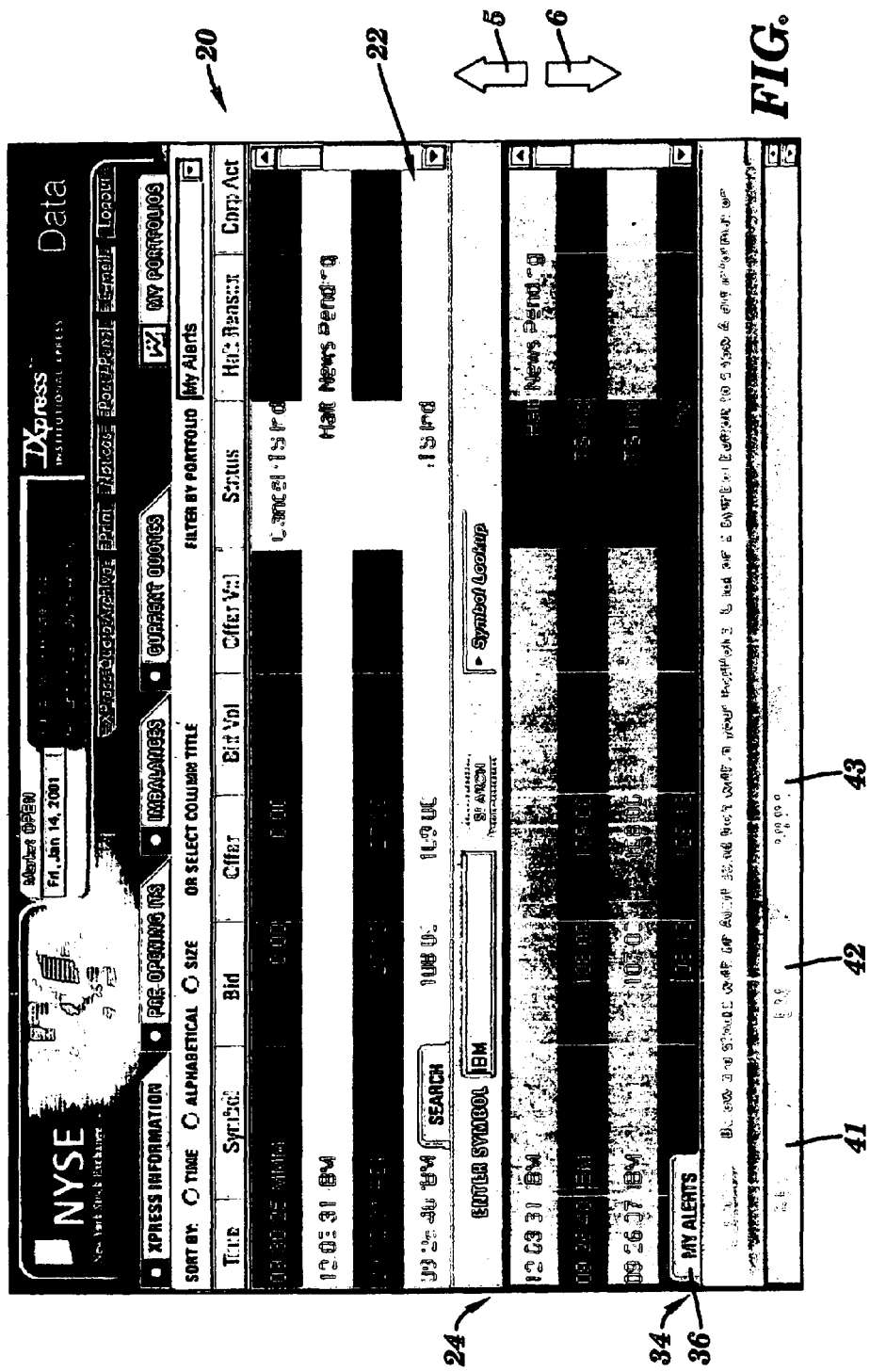
Figure 15:
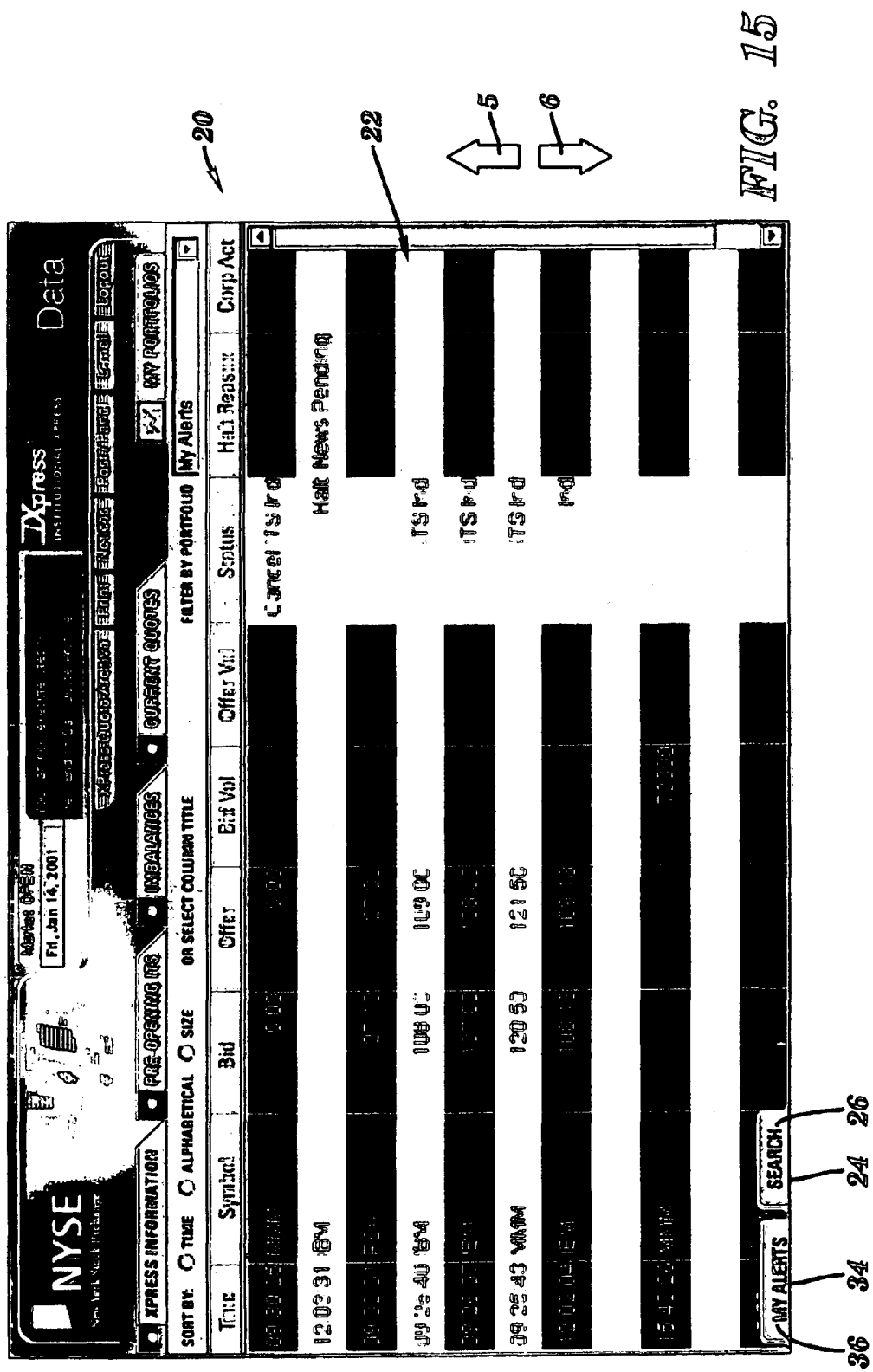
Figure 16:
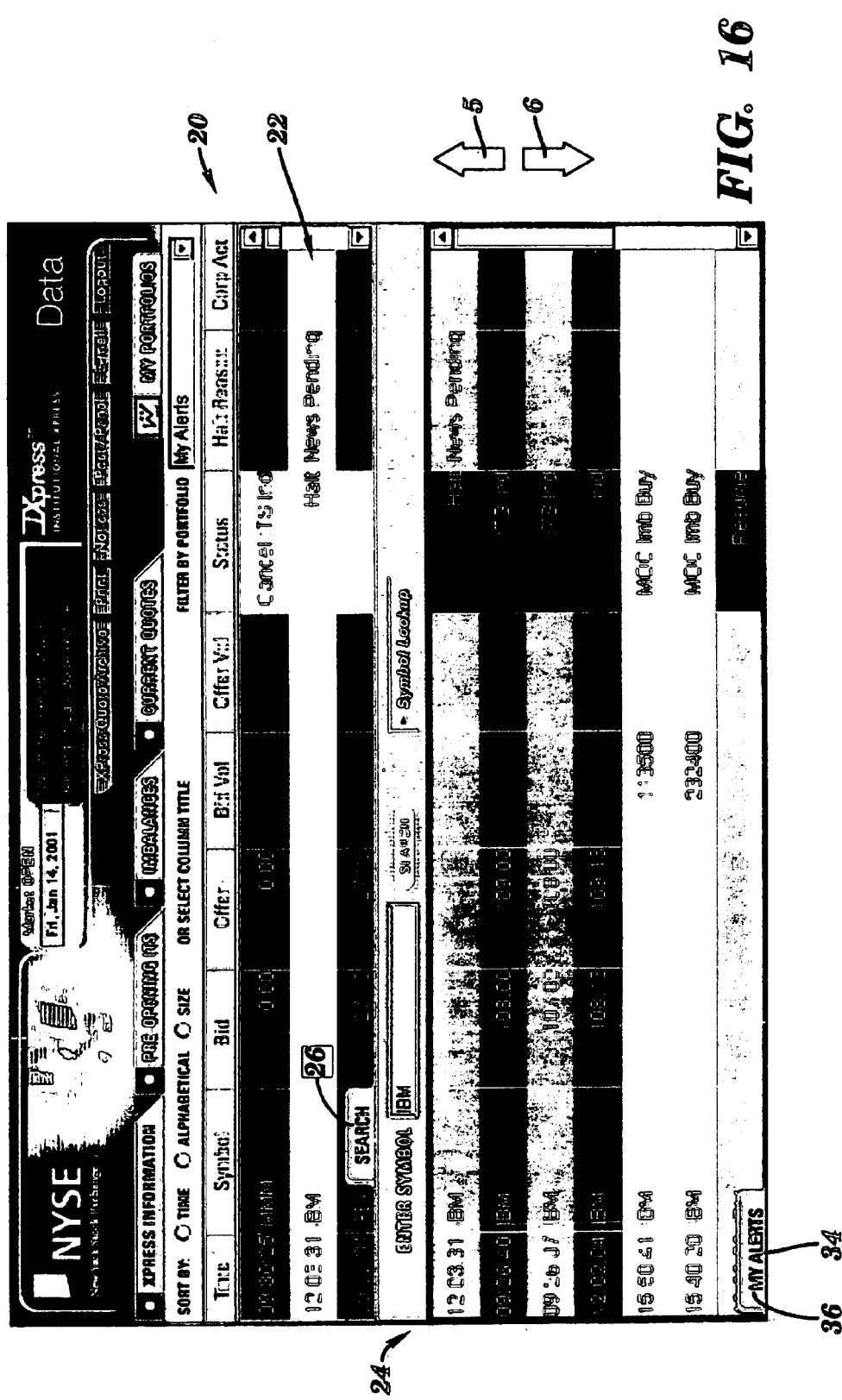
Figure 17:
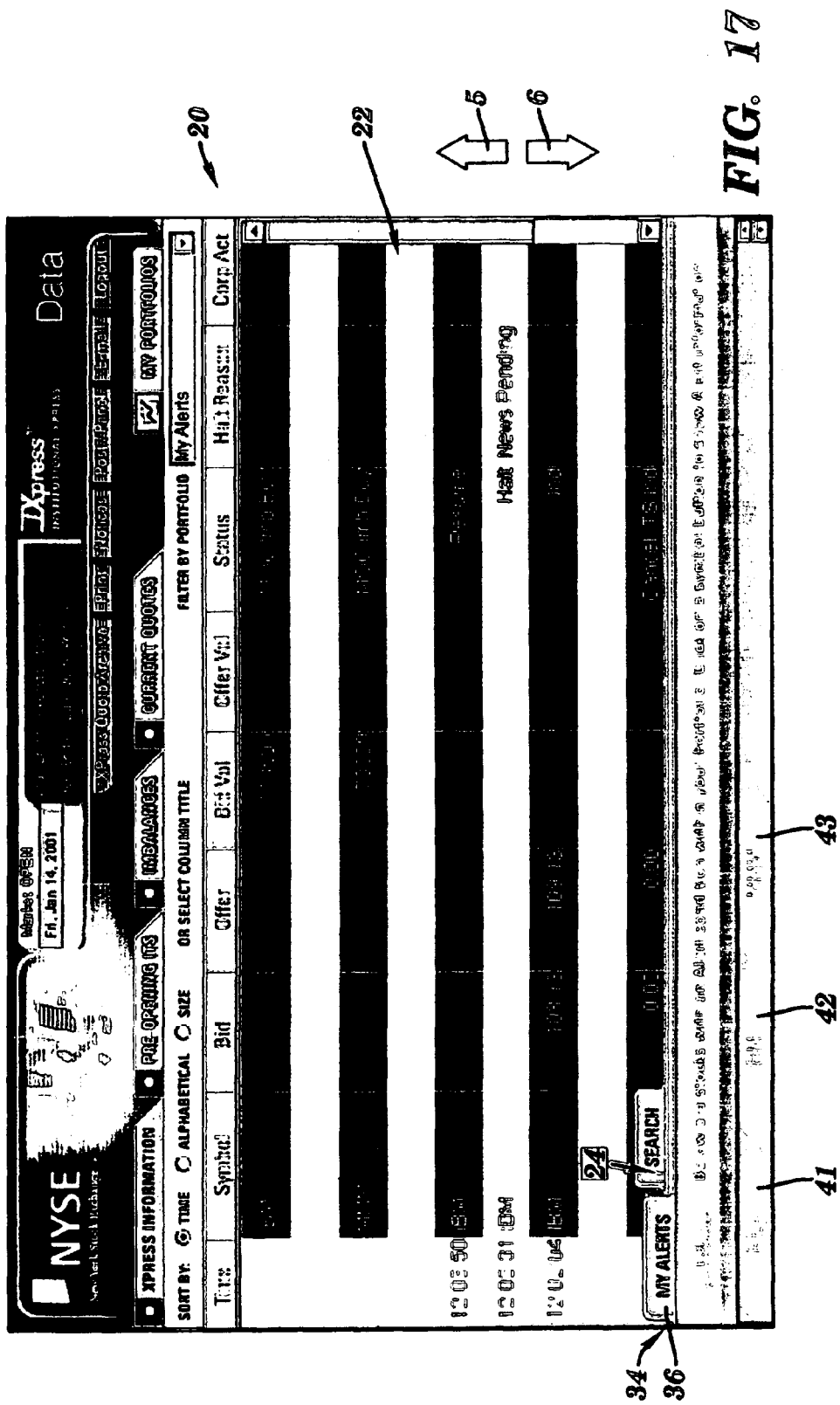
Figure 18:
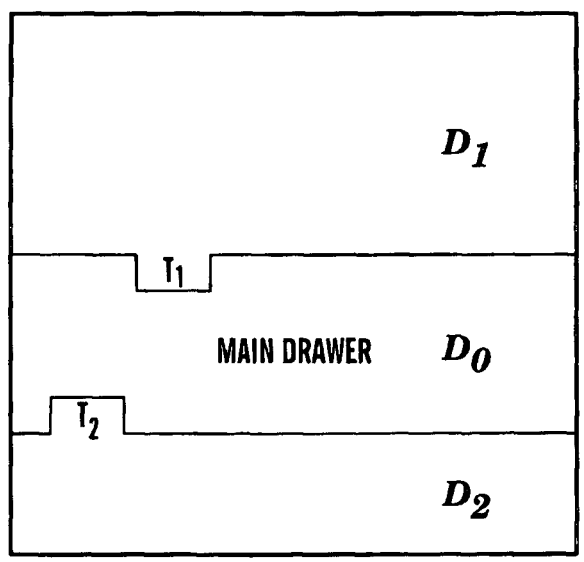
Figure 19:
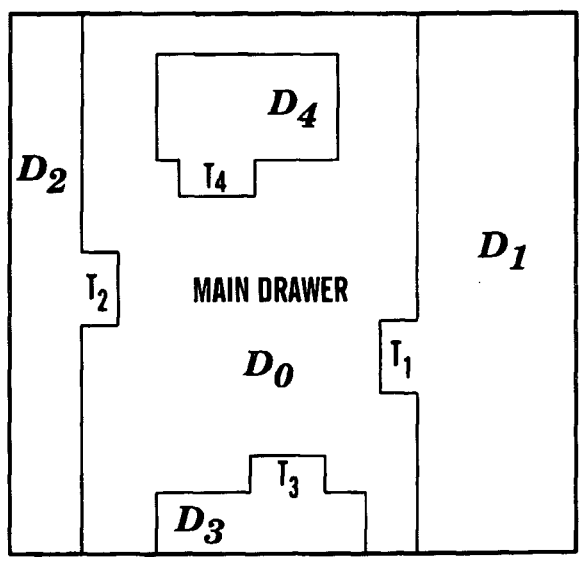
Figure 20:
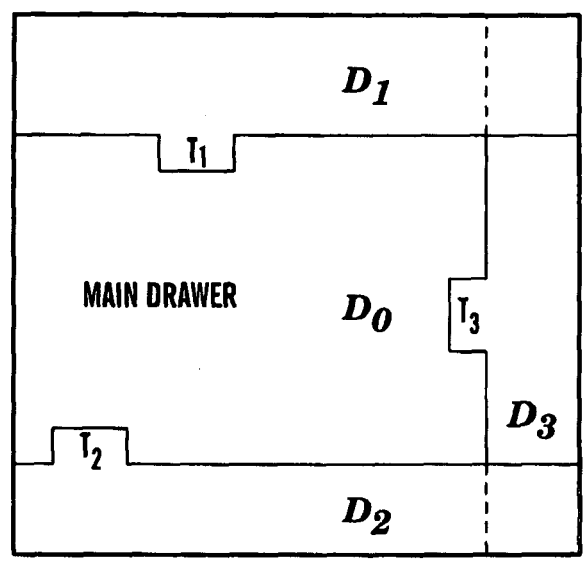
Figure 21:
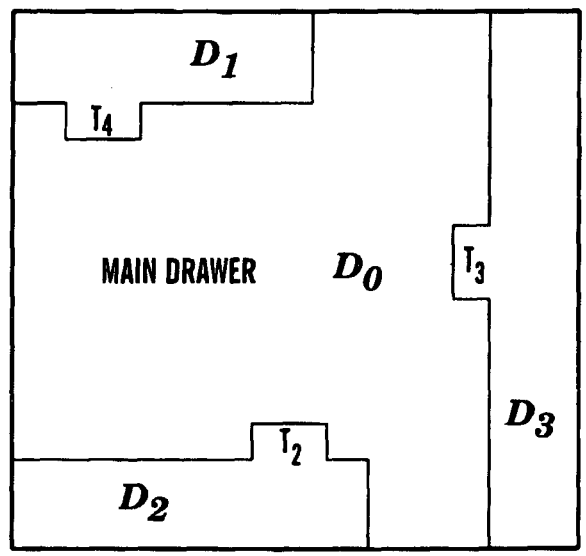

FIG. 17 depicts FIG. 7 such that the main drawer 22 displays the "My Alerts" portfolio subset of the data feed 14. FIG. 17 differs from FIG. 10 in that in FIG. 17 the Search drawer 24 is closed and the Alert drawer 34 is open, while in FIG. 10 both the Search drawer 24 and the Alert drawer 34 are closed.

The features described supra for the NYSE data display structure 20 of FIGS. 7–17 apply generally to the data display structure 18 described for FIGS. 1–7. For example, the stock symbols (e.g., RBK, IBM, MMM, etc.) represent any way of dividing the data feed 14 into subsets, and the portfolio subset represents any way of grouping a finite number of such subsets together as a unit. Further in relation to FIGS. 2–6, none of the main drawer $D_0$ or of the N additional drawers $D_1, D_2, \ldots, D_N$ are required display any portion of a data feed in the spreadsheet format.

Although the NYSE data display structure 20 of FIGS. 7–17 relates to displaying a live data feed of stock market bids and offers, the features described supra for the NYSE data display structure 20 of FIGS. 7–17 also apply to a stored data feed such as a video data feed.

An example of a video data feed application for a movie data feed is as follows. The drawer $D_0$ dynamically displays the movie itself. A portfolio subset of words is selected (such as by a user or viewer), wherein each such word is a subset of the data feed and the words are analogous to the stock symbols described supra in conjunction with FIGS. 7–17. The selected portfolio subset of words generates an Alerts drawer of buttons with each button corresponding to a word in the selected portfolio subset of words. There is a Search drawer that displays content of the data feed relating to a word whose button in the Alerts drawer is selected. Such content may include, inter alia, a sentence or paragraph spoken in the movie, wherein said sentence or paragraph includes said word.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

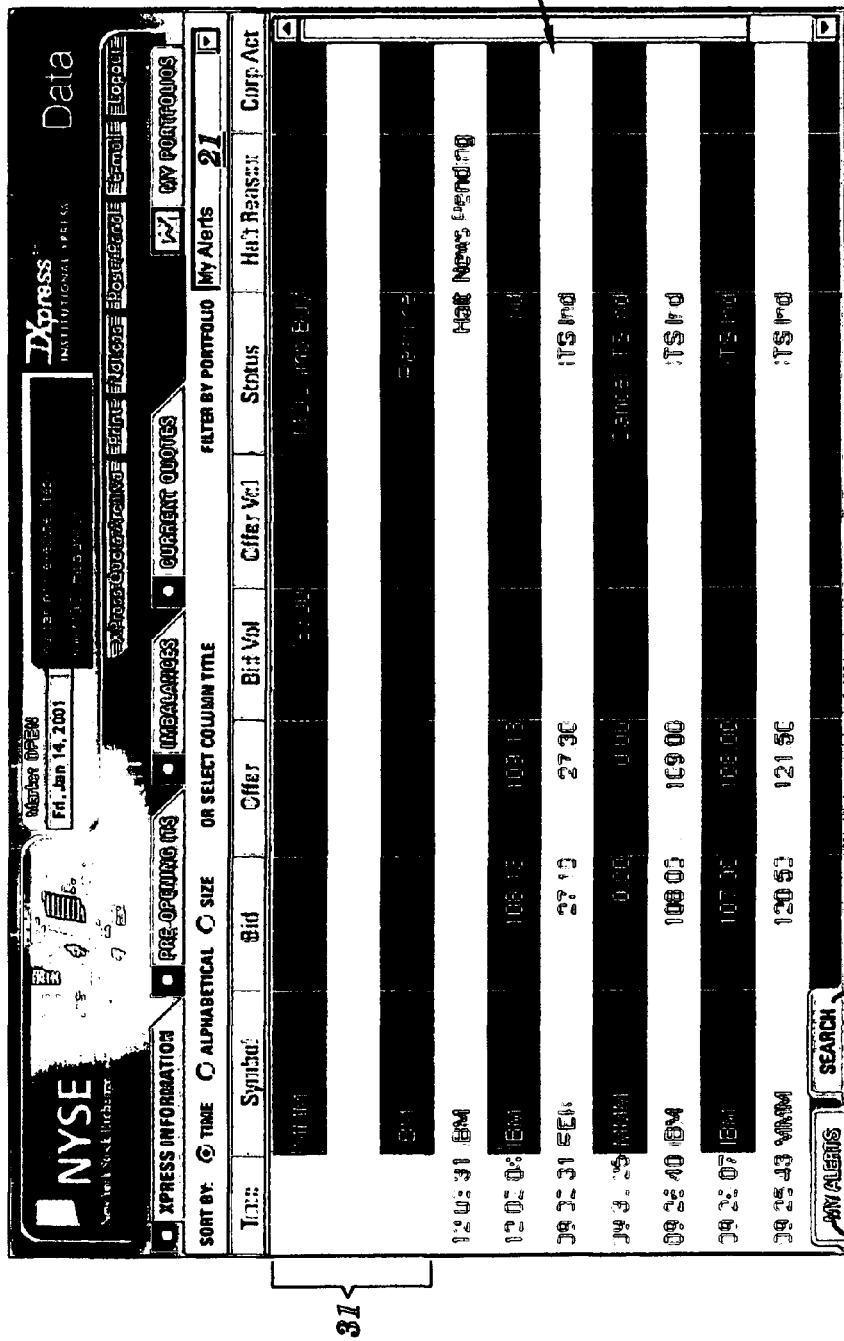

What is claimed is:

1. A computer-readable medium comprising a data display structure encoded therein, said data display structure comprising:

a main drawer $D_0$ that overlays a display screen, wherein $D_0$ is adapted to dynamically display in spreadsheet format a portion of a data feed; and N additional drawers $D_1, D_2, \ldots, D_N$ in an overlay pattern $\{D_1, D_2, \ldots, D_N\}$ relative to $D_0$, wherein N is at least 2, wherein each drawer $D_i$ (i=1, 2, ..., N) is adapted to being opened or to being closed, wherein the N additional drawers include a Search drawer and an Alerts drawer such that the Alerts drawer includes M buttons $B_1, B_2, \ldots, B_M$ respectively identifying a subset $S_1, S_2, \ldots, S_M$ of the data feed, wherein M is at least 1, wherein selection of button $B_m$ causes the Search drawer to dynamically display $S_m$ in spreadsheet format, and wherein m is one of 1, 2, ..., M, and wherein each drawer $D_i$ (i=1, 2, ..., N) includes a tab $T_i$ adapted to be dragged in a first direction to open drawer $D_i$ in the first direction and adapted to be dragged in a second direction to close drawer $D_i$ in the second direction.

2. The computer-readable medium of claim 1, wherein a row $R_{MAIN}$ of data of the main drawer is highlighted for a predetermined period of time $\Delta T_{MAIN}$ during which $R_{MAIN}$ is initially viewable.

3. The computer-readable medium of claim 1, wherein a row $R_{MAIN}$ of data of the main drawer is highlighted in color for a predetermined period of time $\Delta T_{MAIN}$ during which $R_{MAIN}$ is initially viewable.

4. The computer-readable medium of claim 1, wherein a row $R_{SEARCH}$ of the Search drawer is highlighted for a predetermined period of time $\Delta T_{SEARCH}$ during which $R_{SEARCH}$ is initially viewable.

5. The computer-readable medium of claim 1, wherein a row $R_{SEARCH}$ of the Search drawer is highlighted in color for a predetermined period of time $\Delta T_{SEARCH}$ during which $R_{SEARCH}$ is initially viewable.

6. The computer-readable medium of claim 1, wherein selection of button $B_m$ causes $B_m$ to be highlighted until $S_m$ becomes initially viewable.

7. The computer-readable medium of claim 1, wherein selection of button $B_m$ causes $B_m$ to be highlighted until $S_m$ becomes initially viewable.

8. The computer-readable medium of claim 1, wherein a sorting of the drawer in accordance with a sort key causes a sorting of the Search drawer in accordance with the sort key.

9. The computer-readable medium of claim 1, wherein a sorting of the main drawer in accordance with a sort key causes a sorting in accordance with the sort key of each drawer of the N additional drawers that is sortable in accordance with the sort key.

10. The computer-readable medium of claim 1, wherein a sorting of the Search drawer in accordance with a sort key causes a sorting of the main drawer in accordance with the sort key.

11. The computer-readable medium of claim 1, wherein a sorting a first drawer of the N additional drawers in accordance with a sort key causes a sorting in accordance with the sort key of the main drawer and of each remaining drawer of the N additional drawers that is sortable in accordance with the sort key.

12. The computer-readable medium of claim 1, wherein the M buttons constitutes a portfolio of buttons that is user selectable from a menu that includes a plurality of portfolios of buttons.

13. The computer-readable medium of claim 1, wherein the portion of the data feed is all of the data feed.

14. The computer-readable medium of claim 1, wherein the portion of the data feed is a portfolio subset of the data feed.

15. The computer-readable medium of claim 1, wherein a first drawer of the N additional drawers is adapted to display content in accordance with a user command that is directed to the main drawer or to a second drawer of the N additional drawers.

16. The computer-readable medium of claim 1, wherein the data feed is a live data feed.

17. The computer-readable medium of claim 1, wherein the data feed is a stored data feed.

18. The computer-readable medium of claim 17, wherein the stored data feed is a video data feed.

19. The computer-readable medium of claim 2, wherein $B_1, B_2, \ldots, B_M$ are identified with a stock that trades on the stock exchange.

20. The computer-readable medium of claim 19, wherein the stock exchange is the New York Stock Exchange.

21. The computer-readable medium of claim 19, wherein the data feed further comprises stock data selected from the group consisting of stock halt data, stock delay data, stock resume data, stock bid/offer cancellation data, and combinations thereof.

22. The computer-readable medium of claim 19, wherein the spreadsheet format includes a Time column, a Symbol column, a Bid column, an Offer column, a Bid Vol column, an Offer Vol column, and a Status column.

23. The computer-readable medium of claim 22, wherein the spreadsheet format further includes at least one of a Halt Reason column and a Corp Action column.

24. The computer-readable medium of claim 19, wherein all data of the data feed at a given time stamp and relating to a given stock symbol is displayed in no more than one row of the main drawer and in no more than one row of any of the N additional drawers.

25. A method of dynamically displaying data, comprising:
overlaying a main drawer $D_0$ on a display screen;
dynamically displaying, in spreadsheet format on $D_0$, a portion of a data feed; and
positioning N additional drawers $D_1, D_2, \ldots, D_N$ in an overlay pattern $\{D_1, D_2, \ldots, D_N\}$ relative to $D_0$, wherein N is at least 2, wherein each drawer $D_i$ (i=1, 2, \ldots, N) is adapted to being opened or to being closed, wherein the N additional drawers include a Search drawer and an Alerts drawer such that the Alerts drawer includes M buttons $B_1, B_2, \ldots, B_M$ respectively identifying a subset $S_1, S_2, \ldots, S_M$ of the data feed, wherein M is at least 1, wherein selection of button $B_m$ causes the Search drawer to dynamically display $S_m$ in spreadsheet format, and wherein m is one of 1, 2, \ldots, M, wherein each drawer $D_i$ (i=1, 2, \ldots, N) includes a tab $T_i$ adapted to be dragged in a first direction to open drawer $D_i$ in the first direction and adapted to be dragged in a second direction to close drawer $D_i$ in the second direction.

26. The method of claim 25, further comprising highlighting a row $R_{MAIN}$ of data of the main drawer for a predetermined period of time $\Delta T_{MAIN}$ during which $R_{MAIN}$ is initially viewable.

27. The method of claim 25, further comprising highlights in color a row $R_{MAIN}$ of data of the main drawer for a predetermined period of time $\Delta T_{MAIN}$ during which $R_{MAIN}$ is initially viewable.

28. The method of claim 25, further comprising highlighting a row $R_{SEARCH}$ of the Search drawer for a predetermined period of time $\Delta T_{SEARCH}$ during which $R_{SEARCH}$ is initially viewable.

29. The method of claim 25, further comprising highlighting in color a row $R_{SEARCH}$ of the Search drawer for a predetermined period of time $\Delta T_{SEARCH}$ during which $R_{SEARCH}$ is initially viewable.

30. The method of claim 25, further comprising if selecting button $B_m$ then highlighting $B_m$ immediately following said selecting of $B_m$, until the portion of $S_m$ becomes initially viewable.

31. The method of claim 25, further comprising if selecting button $B_m$ then highlighting in color $B_m$ immediately following said selecting of $B_m$, until the portion of $S_m$ becomes initially viewable.

32. The method of claim 25, further comprising:
sorting the main drawer in accordance with a sort key; and
sorting the Search drawer in accordance with the sort key, wherein the sorting of the Search drawer is triggered by the sorting of the main drawer.

33. The method of claim 25, further comprising:
sorting the main drawer in accordance with a sort key; and
sorting in accordance with the sort key each additional drawer that is sortable in accordance with the sort key, wherein the sorting of the each additional drawer is triggered by the sorting of the main drawer.

34. The method of claim 25, further comprising:
sorting the Search drawer in accordance with a sort key; and
sorting the main drawer in accordance with the sort key, wherein the sorting of the main drawer is triggered by the sorting of the Search drawer.

35. The method of claim 25, further comprising:
sorting a first drawer of the drawer of the N additional drawers in accordance with a sort key; and
sorting in accordance with the sort key each remaining drawer of the N additional drawers that is sortable in accordance with the sort key, wherein the sorting of each such remaining drawer is triggered by the sorting of the first drawer.

36. The method of claim 25, wherein the M buttons constitutes a portfolio of buttons that is user selectable from a menu that includes a plurality of portfolios of buttons, and further comprising selecting by the user the M buttons from the plurality of portfolios of buttons.

37. The method of claim 25, further comprising dynamically selecting the multisubset of the data feed to by either all of the data feed or less than all of the data feed.

38. The method of claim 25, wherein the portion of the data feed is all of the data feed.

39. The method of claim 25, wherein the portion of the data feed is a portfolio subset of the data feed.

40. The method of claim 25, further comprising:
executing a user command that is directed to the main drawer or to a first drawer of the N additional drawers; and
displaying content on a second drawer of the N additional drawers based on the user command.

41. The method of claim 25, wherein providing the data feed includes providing a live data feed.

42. The method of claim 25, wherein providing the data feed includes providing a stored data feed.

43. The method of claim 42, wherein the stored data feed is a video data feed.

44. The method of claim 27, wherein $B_1, B_2, \ldots, B_M$ are each identified with a stock that trades on the stock exchange.

45. The method of claim 44, wherein the stock exchange is the New York Stock Exchange.

46. The method of claim 44, wherein the live data feed further comprises stock data selected from the group consisting of stock halt data, stock delay data, stock resume data, stock bid/offer cancellation data, and combinations thereof.

47. The method of claim 46, wherein the spreadsheet format further includes at least one of a Halt Reason column and a Corp Action column.

48. The method of claim 44, wherein the spreadsheet format includes a Time column, a Symbol column, a Bid column, an Offer column, a Bid Vol column, an Offer Vol column, and a Status column.

49. The method of claim 25, further comprising dragging the tab $T_k$ of drawer $D_k$ in the first direction or in the second direction, wherein k is one of $1, 2, \ldots,$ and N.

50. A method of dynamically displaying data, comprising:
overlaying a main drawer $D_0$ on a display screen;
dynamically displaying, in spreadsheet format on $D_0$, a portion of a data feed;
positioning N additional drawers $D_1, D_2, \ldots D_N$ in an overlay pattern $\{D_1, D_2, \ldots, D_N\}$ relative to $D_0$, wherein N is at least 2, wherein each drawer $D_i$ (i=1, 2, ..., N) is adapted to being opened or to being closed, wherein the N additional drawers include a Search drawer and an Alerts drawer such that the Alerts drawer includes M buttons $B_1, B_2, \ldots, B_M$ respectively identifying a subset $S_1, S_2, \ldots, S_M$ of the data feed, and wherein M is at least 1;
selecting a button $B_m$, wherein m is one of $1, 2, \ldots, M$; and
dynamically displaying $S_m$, in spreadsheet format on the Search drawer, wherein said dynamically displaying is triggered by the selecting of the button $B_m$, wherein each drawer $D_i$ (i=1, 2, ..., N) includes a tab $T_i$ adapted to be dragged in a first direction to open drawer $D_i$ in the first direction and adapted to be dragged in a second direction to close drawer $D_i$ in the second direction.

51. A method of dynamically displaying data, comprising:
overlaying a main drawer $D_0$ on a display screen;
dynamically displaying, in spreadsheet format on $D_0$, a portion of a data feed;
positioning N additional drawers $D_1, D_2, \ldots, D_N$ in an overlay pattern $\{D_1, D_2, D_N\}$ relative to $D_0$, wherein N is at least 2, wherein the additional drawers include a Search drawer and an Alerts drawer such that the Alerts drawer includes M buttons $B_1, B_2, \ldots, B_M$ respectively identifying a subset $S_1, S_2, \ldots, S_M$ of the data feed, wherein M is at least 1, wherein selection of button $B_m$ causes the Search drawer to dynamically display $S_m$ in spreadsheet format, wherein m is one of $1, 2, \ldots, M$; and
opening or closing drawer $D_i$, wherein i is one of $1, 2, \ldots,$ and N, wherein each drawer $D_i$ (i=1, 2, ..., N) includes a tab $T_i$ adapted to be dragged in a first direction to open drawer $D_i$ in the first direction and adapted to be dragged in a second direction to close drawer $D_i$ in the second direction.

52. A method of dynamically displaying data, comprising:
overlaying a main drawer $D_0$ on a display screen;
dynamically displaying, in spreadsheet format on $D_0$, a portion of a data feed, wherein the data feed comprises stock bids and offers on a stock exchange;
positioning N additional drawers $D_1, D_2, \ldots, D_N$ in an overlay pattern $\{D_1, D_2, \ldots, D_N\}$ relative to $D_0$, wherein N is at least 2, wherein each drawer $D_i$ (i=1, 2, ..., N) is adapted to being opened or to being closed, wherein the N additional drawers include a Search drawer and an Alerts drawer such that the Alerts drawer includes M buttons $B_1, B_2, \ldots, B_M$ respectively identifying a subset $S_1, S_2, \ldots, S_M$ of the data feed, wherein M is at least 1, and wherein $B_1, B_2, \ldots, B_M$ are each identified with a stock that trades on the stock exchange;
selecting a button $B_m$, wherein m is one of $1, 2, \ldots, M$; and
dynamically displaying $S_m$ in spreadsheet format on the Search drawer, wherein said dynamically displaying is triggered by the selecting of the button $B_m$, wherein each drawer $D_i$ (i=1, 2, ..., N) includes a tab $T_i$ adapted to be dragged in a first direction to open drawer $D_i$ in the first direction and adapted to be dragged in a second direction to close drawer $D_i$ in the second direction.

53. A method of dynamically displaying data, comprising:
overlaying a main drawer $D_0$ on a display screen;
dynamically displaying, in spreadsheet format on $D_0$, a portion of a data feed, wherein the data feed comprises stock bids and offers on a stock exchange;
positioning N additional drawers $D_1, D_2, \ldots, D_N$ in an overlay pattern $\{D_1, D_2, \ldots, D_N\}$ relative to $D_0$, wherein N is at least 2, wherein the N additional drawers include a Search drawer and an Alerts drawer such that the Alerts drawer includes M buttons $B_1, B_2, \ldots, B_M$ respectively identifying a subset $S_1, S_2, \ldots, S_M$ of the data feed, wherein M is at least 1, wherein selection of button $B_m$ causes the Search drawer to dynamically display $S_m$ in spreadsheet format, wherein m is one of $1, 2, \ldots, M$, and wherein $B_1, B, \ldots, B_M$ are identified with a stock that trades on the stock exchange; and
opening or closing drawer $D_i$, wherein i is one of $1, 2, \ldots,$ and N, wherein each drawer $D_i$ (i=1, 2, ..., N) includes a tab $T_i$ adapted to be dragged in a first direction to open drawer $D_i$ in the first direction and adapted to be dragged in a second direction to close drawer $D_i$ in the second direction.

54. A computer-readable medium comprising a data display structure encoded therein, said data display structure comprising:
a main drawer $D_0$ that overlays a display screen, wherein $D_0$ is adapted to dynamically display a portion of a data feed; and
N additional drawers $D_1, D_2, \ldots, D_N$ in an overlay pattern $\{D_1, D_2, \ldots, D_N\}$ relative to $D_0$, wherein N is at least 2, wherein each drawer $D_i$ (i=1, 2, ..., N) is adapted to being opened or to being closed, and wherein a first drawer of $D_0, D_1, \ldots, D_N$ is adapted to display content in response to selection of a button of a second drawer of $D_0, D_1, \ldots, D_N$.

55. A method of dynamically displaying data, comprising:
overlaying a main drawer $D_0$ on a display screen;
dynamically displaying on $D_0$ a portion of a data feed; and
positioning N additional drawers $D_1, D_2, \ldots, D_N$ in an overlay pattern $\{D_1, D_2, \ldots, D_N\}$ relative to $D_0$, wherein N is at least 2, wherein each drawer $D_i$ (i=1, 2, ..., N) is adapted to being opened or to being closed;
selecting a button of a first drawer of $D_0, D_1, \ldots, D_N$; and
displaying content on a second drawer of $D_0, D_1, D_N$ in response to the selection of the button of the first drawer.

56. A system for dynamically displaying data, comprising:
a main drawer $D_0$ that overlays a display screen;
means for dynamically displaying, in spreadsheet format on $D_0$, a portion of a data feed; and N additional drawers $D_1, D_2, \ldots, D_N$ on the display screen in an overlay pattern $\{D_1, D_2, \ldots, D_N\}$ relative to $D_0$, wherein N is at least 2, wherein each drawer $D_i$ (i=1, 2, ..., N) is adapted to being opened or to being closed, wherein the N additional drawers include a Search drawer and an Alerts drawer such that the Alerts drawer includes M buttons $B_1, B_2, \ldots, B_M$ respectively identifying a subset $S_1, S_2, \ldots, S_M$ of the data feed, wherein M is at least 1, wherein selection of button $B_m$ causes the Search drawer to dynamically display $S_m$ in spreadsheet format, and wherein m is one of 1, 2, ..., M, wherein each drawer $D_i$ (i=1, 2, ..., N) includes a tab $T_i$ adapted to be dragged in a first direction to open drawer $D_i$ in the first direction and adapted to be dragged in a second direction to close drawer $D_i$ in the second direction.

* * * * *

UNITED STATES PATENT AND TRADEMARK OFFICE
CERTIFICATE OF CORRECTION

PATENT NO.        : 7,000,181 B2
APPLICATION NO. : 09/886199
DATED             : February 14, 2006
INVENTOR(S)       : Press It is certified that error appears in the above-identified patent and that said Letters Patent is hereby corrected as shown below:

On the Title Page 2, Item (56)
Line 9, delete "Fillings" and insert --filings--

Column 3
Lines 66 and 67, delete "D3" and insert --$D_3$--

Column 4
Line 1, delete "D3" and insert --$D_3$--

Column 7
Line 52, delete "$M \geqq$" and insert --$M \geq$--

Column 10
Line 61, delete "highlighted until" and insert --highlighted in color until--

Column 12
Line 13, delete "highlights" and insert --highlighting--

Signed and Sealed this

Third Day of February, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,000,181 B2 | Page 1 of 18 |
| APPLICATION NO. | : 09/886199 | |
| DATED | : February 14, 2006 | |
| INVENTOR(S) | : Press | |

It is certified that error appears in the above-identified patent and that said Letters Patent is hereby corrected as shown below:

On the Title Page
Delete drawing Fig., on Title Page, and substitute with attached drawing Fig.

On the Title Page 2, Item (56)
Line 9, delete "Fillings" and insert --filings--

Drawings
Drawing sheets 4-14 are to be published in color. A set of drawings in color is enclosed. A copy of the *Petition to Allow Color Drawings* is enclosed (Appendix 1). The Examiner objected to the clarity of Figures 7 - 17 in the drawings sheets in the 11/18/2004 *Office Action*. The applicant submitted black and white drawings in the 02/14/2005 response to the *Office Action* as a courtesy for the benefit of the Examiner in reading the drawings. In the 02/14/2005 response the applicant states that the black and white drawing sheets were not a replacement for the colored drawing sheet originally submitted. (Appendix 2).

Column 3
Lines 66 and 67, delete "D3" and insert --$D_3$--

Column 4
Line 1, delete "D3" and insert --$D_3$--

Column 7
Line 52, delete "M $\geqq$" and insert --M $\geq$--

Column 10
Line 61, delete "highlighted until" and insert --highlighted in color until--

Column 12
Line 13, delete "highlights" and insert --highlighting--

Signed and Sealed this

Fourteenth Day of December, 2010

David J. Kappos
*Director of the United States Patent and Trademark Office*

(12) United States Patent
Press

(10) Patent No.: US 7,000,181 B2
(45) Date of Patent: Feb. 14, 2006

(54) DYNAMIC DATA DISPLAY HAVING SLIDE DRAWER WINDOWING

(75) Inventor: Robert Press, New York, NY (US)

(73) Assignee: International Business Machines Corporation, Armonk, NY (US)

(*) Notice: Subject to any disclaimer, the term of this patent is extended or adjusted under 35 U.S.C. 154(b) by 820 days.

(21) Appl. No.: 09/886,199

(22) Filed: Jun. 21, 2001

(65) Prior Publication Data

US 2002/0198906 A1     Dec. 26, 2002

(51) Int. Cl.
*G06F 15/00* (2006.01)

(52) U.S. Cl. .................................... 715/503; 715/777
(58) Field of Classification Search ............... 715/503, 715/504, 500, 776, 777, 764; 345/790, 840
See application file for complete search history.

(56) References Cited

U.S. PATENT DOCUMENTS

| | | | | |
|---|---|---|---|---|
| 5,255,363 A | | 10/1993 | Seyler | |
| 5,392,387 A | * | 2/1995 | Fitzpatrick et al. | 715/776 |
| 5,542,040 A | * | 7/1996 | Chang et al. | 715/776 |
| 5,623,282 A | | 4/1997 | Graham et al. | |
| 5,623,591 A | | 4/1997 | Cseri | |
| 5,634,095 A | * | 5/1997 | Wang et al. | 715/763 |
| 5,784,545 A | | 7/1998 | Anderson et al. | |
| 5,819,263 A | * | 10/1998 | Bromley et al. | 707/3 |
| 5,870,092 A | * | 2/1999 | Bedford-Roberts | 715/776 |
| 5,894,311 A | * | 4/1999 | Jackson | 345/440 |
| 6,037,941 A | * | 3/2000 | Goto | 715/777 |
| 6,134,535 A | * | 10/2000 | Belzberg | 705/37 |
| 6,157,934 A | * | 12/2000 | Khan et al. | 715/503 |
| 6,225,996 B1 | * | 5/2001 | Gibb et al. | 715/784 |
| 6,246,407 B1 | * | 6/2001 | Wilks et al. | 715/803 |
| 6,266,814 B1 | * | 7/2001 | Lemmons et al. | 725/44 |
| 6,445,400 B1 | * | 9/2002 | Maddalozzo et al. | 715/803 |
| 6,557,164 B1 | * | 4/2003 | Faustini | 717/107 |
| 6,613,098 B1 | * | 9/2003 | Sorge et al. | 715/503 |
| 6,701,485 B1 | * | 3/2004 | Igra et al. | 715/503 |
| 6,850,255 B1 | * | 2/2005 | Muschetto | 715/788 |
| 2002/0010743 A1 | * | 1/2002 | Ryan et al. | 709/205 |
| 2002/0015609 A1 | * | 2/2002 | Webber | 400/489 |
| 2002/0032611 A1 | * | 3/2002 | Khan | 705/26 |
| 2002/0070972 A1 | * | 6/2002 | Windl et al. | 345/777 |
| 2002/0085040 A1 | * | 7/2002 | Krolczyk et al. | 345/777 |

OTHER PUBLICATIONS

Polilli, Conferencing Software Available for Windows, Info-World, Feb. 7, 1994, vol. 16, iss. 6, p. 44, 1 pgs, from ProQuest as pp. 1-2.*

(Continued)

*Primary Examiner*—Cong-Lac Huynh
(74) *Attorney, Agent, or Firm*—Schmeiser, Olsen & Watts; John R. Pivnichny

(57) ABSTRACT

A dynamic data display system and associated method of usage. A portion of a data feed is dynamically displayed, such as in spreadsheet format, on a main drawer $D_0$ that overlays a display screen. N additional drawers $D_1$, $D_2$, ..., $D_N$ are positioned such that $D_1$ conditionally overlays $D_0$, $D_2$ conditionally overlays $D_1$, ..., $D_N$ conditionally overlays $D_{N-1}$. N is at least 2. Each drawer $D_i$ (i=1, 2, ..., N) is adapted to being opened or to being closed. A user command is directed to a first drawer of the N additional drawers, which causes content on a second drawer of the N additional drawers to be displayed in accordance with the user command.

56 Claims, 16 Drawing Sheets